(12) United States Patent
Ohtsuka

(10) Patent No.: US 6,434,106 B1
(45) Date of Patent: Aug. 13, 2002

(54) OPTICAL INFORMATION STORAGE UNIT AND LASER POWER CONTROL METHOD

(75) Inventor: Masaoki Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/239,157

(22) Filed: Jan. 28, 1999

(30) Foreign Application Priority Data

Feb. 13, 1998 (JP) .............................. 10-031362

(51) Int. Cl.[7] .................................. G11B 7/00
(52) U.S. Cl. ............. 369/116; 369/47.53; 369/53.12; 369/53.27
(58) Field of Search ............... 369/116, 54, 13, 369/53.26, 53.19, 44.27, 275.3, 53.12, 13.26, 53.37, 53.29, 53.27, 47.53, 53.3

(56) References Cited

U.S. PATENT DOCUMENTS

| | | | | |
|---|---|---|---|---|
| 5,341,360 A | * | 8/1994 | Johann et al. | 369/116 |
| 5,600,500 A | * | 2/1997 | Madsen et al. | 360/46 |
| 5,732,055 A | | 3/1998 | Masaki et al. | 369/54 |
| 5,796,704 A | | 8/1998 | Nanba et al. | 369/116 |
| 5,978,351 A | * | 11/1999 | Spruit et al. | 369/275.3 |

FOREIGN PATENT DOCUMENTS

| | | |
|---|---|---|
| JP | 58-159216 | 9/1983 |
| JP | 61-296529 | 12/1986 |
| JP | 4-30328 | 2/1992 |
| JP | 5-47111 | 2/1993 |
| JP | 5-47112 | 2/1993 |
| JP | 7-129958 | 5/1995 |
| JP | 7-311942 | 11/1995 |
| JP | 8-221760 | 8/1996 |
| JP | 8-339541 | 12/1996 |
| JP | 9-293259 | 11/1997 |

* cited by examiner

Primary Examiner—David Hudspeth
Assistant Examiner—Kim-Kwok Chu
(74) Attorney, Agent, or Firm—Greer, Burns & Crain, Ltd.

(57) ABSTRACT

An optical information storage unit optically stores information on a disk shaped recording medium by irradiating a laser beam on the recording medium. The optical information storage unit is provided with a section which controls a laser power of the laser beam irradiated on the recording medium depending on a rotary angle of the recording medium.

24 Claims, 24 Drawing Sheets

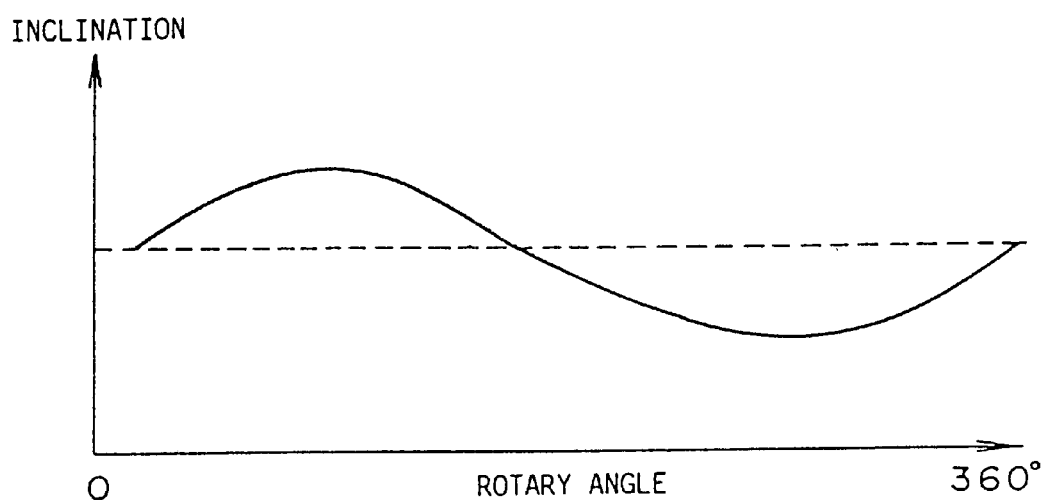

FIG. 10

| SECTOR | #0 | #1 | #2 | ... | #(n-1) |
|---|---|---|---|---|---|
| POWER OFFSET | $\Delta P_0$ | $\Delta P_1$ | $\Delta P_2$ | ... | $\Delta P_{(n-1)}$ |

| POWER OFFSET | #0 | #1 | #2 | ... | #(n-1) |
|---|---|---|---|---|---|
| $-(i*k)$ | $e_{(-i),0}$ | $e_{(-i),1}$ | $e_{(-i),2}$ | ... | $e_{(-i),(n-1)}$ |
| $-((i-1)*k)$ | $e_{(-(i-1)),0}$ | $e_{(-(i-1)),1}$ | $e_{(-(i-1)),2}$ | | $e_{(-(i-1)),(n-1)}$ |
| ... | ... | ... | ... | | |
| 0 | $e_{0,0}$ | $e_{0,1}$ | $e_{0,2}$ | | $e_{0,(n-1)}$ |
| ... | ... | ... | ... | | ... |
| $((i-1)*k)$ | $e_{(i+1),0}$ | $e_{(i+1),1}$ | $e_{(i+1),2}$ | | $e_{(i+1),(n-1)}$ |
| $(i*k)$ | $e_{i,0}$ | $e_{i,1}$ | $e_{i,2}$ | | $e_{i,(n-1)}$ |

| | #0 | #1 | #2 | ... | #(n-1) | |
|---|---|---|---|---|---|---|
| Z0 | $\Delta p_{0,0}$ | $\Delta p_{1,0}$ | $\Delta p_{2,0}$ | ... | $\Delta p_{(n-1),0}$ | |
| Z1 | $\Delta p_{0,1}$ | $\Delta p_{1,1}$ | $\Delta p_{2,1}$ | ... | $\Delta p_{(n-1),1}$ | |
| . | | | | . | | |
| . | | | | . | | |
| . | | | | . | | |
| . | | | | . | | |
| . | | | | . | | |
| Z(m-1) | $\Delta p_{0,(m-1)}$ | $\Delta p_{1,(m-1)}$ | $\Delta p_{2,(m-1)}$ | ... | $\Delta p_{(n-1),(m-1)}$ | |

| BLOCK | B1 | B2 | B3 | ... | Bn |
|---|---|---|---|---|---|
| POWER OFFSET | $\Delta P_0$ | $\Delta P_1$ | $\Delta P_2$ | ... | $\Delta P_{(n-1)}$ |

OPTICAL INFORMATION STORAGE UNIT AND LASER POWER CONTROL METHOD

BACKGROUND OF THE INVENTION

The present invention generally relates to optical information storage units and laser power control methods, and more particularly to an optical information storage unit which uses a replaceable recording medium and to a laser power control method for controlling a laser power of a laser beam irradiated on a recording medium.

Recently, optical disks are regarded as possibly forming a core technology of the rapidly developing multimedia systems. In addition, there are demands to realize large storage capacities in the optical disks. For example, the maximum storage capacity of a recently proposed magneto-optical disk having a diameter of 3.5 inches is 640 MB. In such an optical disk having a large storage capacity, a beam spot of a light beam irradiated on the optical disk has an extremely small diameter, and a highly accurate tracking servo and laser power are required.

Generally, in the case of a storage unit which uses a replaceable recording medium, there exist mechanical errors of a recording medium loading process with respect to a spindle motor, and mechanical tolerances of a holding part which holds the loaded recording medium. In addition, the recording medium itself has physical inconsistencies and distortions in the shape thereof.

For this reason, there are cases where the recording medium is set obliquely with respect to an optical head. In such cases, the so-called tilt or skew is generated.

FIGS. 1A and 1B are diagrams showing an example of a conventional recording medium in a reproducing state. FIG. 2 is a diagram showing an example of a characteristic of a position of the recording medium with respect to a head position in the reproducing state of the recording medium.

FIG. 1A shows a perspective view of a recording medium 102. Further, FIG. 1B shows a state where the recording medium 102 is set obliquely with respect to an optical head 103. In this state, a recording surface of the recording medium 102 is not perpendicular but is inclined with respect to a rotary shaft 101 of a spindle motor 100.

When the recording medium 102 is rotated by the spindle motor 100 in the state shown in FIG. 1A and a beam spot 105 of a laser beam emitted from the optical head 103 scans a track 104 on the recording surface of the recording medium 102, a relationship between an optical axis of the laser beam emitted from the optical head 103 and an inclination of the surface of the recording medium 102 undergoes a sinusoidal change as shown in FIG. 2. In FIG. 2, the head position, that is, the optical axis of the laser beam emitted from the optical head 103, is indicated by a rotary angle in degrees.

FIGS. 3A and 3B are diagrams showing another example of the conventional recording medium in the reproducing state. FIG. 4 is a diagram showing an example of a characteristic of an inclination of the recording medium with respect to a head position in the reproducing state of the recording medium.

FIG. 3A shows a perspective view of a recording medium 110 which is generally deformed in a shape of an umbrella or an upside down bowl. Further, FIG. 3B shows a state where the recording medium 110 is set obliquely with respect to the optical head 103. In FIG. 3B, those parts which are the same as those corresponding parts in FIG. 1B are designated by the same reference numerals, and a description thereof will be omitted.

When the optical head 103 moves in a direction A2 in the state shown in FIG. 3B, a relationship between the optical axis of the laser beam emitted from the optical head 103 and the inclination of the recording surface of the recording medium 110 changes as shown in FIG. 4. In FIG. 4, the abscissa indicates the head position along the radial direction of the recording medium 110.

In the states shown in FIGS. 1B and 3B, the laser beam from the optical head does not reach the recording medium perpendicularly to the recording surface of the recording medium, and for this reason, an anticipated reflected light cannot be obtained. In other words, an anticipated laser power cannot be obtained due to a shape distortion of the beam spot.

When the anticipated laser power cannot be obtained, the effects caused thereby is small if the conditions such as the track pitch and the bit per inch (BPI) are not strict, that is, if the recording density is low. However, if the conditions such as the track pitch and the BPI are strict, that is, if the recording density is high, the effects caused by the reduced laser power are no longer negligible, and an error rate is increased thereby.

Therefore, methods of mechanically correcting the tilt or the skew by correcting the inclination of the spindle motor have been proposed.

But according to the methods of mechanically correcting the tilt or the skew by correcting the inclination of the spindle motor, there were problems in that a mechanical structure is required to control the inclination, and a space is required to accommodate this mechanical structure. In addition, there was another problem in that this mechanical structure cannot follow a high-speed rotation of the recording medium, since the spindle motor must be mechanically displaced.

SUMMARY OF THE INVENTION

Accordingly, it is a general object of the present invention to provide a novel and useful optical information storage unit in which the problems described above are eliminated.

Another and more specific object of the present invention is to provide an optical information storage unit which can obtain an optimum laser power regardless of the inclination of the recording medium, by controlling the laser power.

Still another object of the present invention is to provide an optical information storage unit which optically stores information on a disk shaped recording medium by irradiating a laser beam on the recording medium by a laser beam irradiating section, comprising a power control section controlling a laser power of the laser beam irradiated on the recording medium by the laser beam irradiating section depending on a rotary angle of the recording medium. According to the optical information storage unit of the present invention, the laser power can be controlled to an optimum value even if the laser beam is not perpendicularly incident to the recording medium, such as a case where the recording medium is loaded obliquely with respect to a rotary shaft, and it is therefore possible to accurately record and reproduce information with respect to the recording medium.

In the optical information storage unit, the power control section may control the laser power of the laser beam for each of blocks, where each of the blocks is made up of a predetermined number of sectors dividing a recording surface of the recording medium in a circumferential direction of the recording medium. In this case, it is possible to reduce the number of set values for the laser power, and the circuit scale of the optical information storage unit can be reduced.

In the optical information storage unit, wherein the power control section may control the laser power of the laser beam for each of zones dividing the recording surface of the recording medium in a radial direction of the recording medium. In this case, it is possible to appropriately control the laser power not only when the recording medium is inclined, but also when the recording medium is deformed.

In the optical information storage unit, the power control section may comprise a memory storing set values of the laser power for each region of the recording medium, and a power switching section reading the set value from the memory depending on a region of the recording medium irradiated by the laser beam, and switching the laser power of the laser beam emitted from the laser beam irradiating section based on the read set value. The memory may store, as the set values, offset values each of which is added to an initial value of the laser power when determining the laser power of the laser beam. In this case, it is possible to reduce the memory capacity required to store the set values in the memory, and the circuit scale of the optical information storage unit can be reduced.

The optical information storage unit may further comprise a section writing a test pattern on the recording medium and reading the test pattern from the recording medium, where the memory stores the set values depending on the test pattern read from the recording medium. In this case, it is possible to control the laser power for each individual recording medium which is loaded into the optical information storage unit, so that information can be read and written with respect to the recording medium under optimum conditions for the recording medium.

A further object of the present invention is to provide a laser power control method for controlling a laser power of a laser beam irradiated on a recording medium, comprising the steps of (a) controlling the laser power of the laser beam irradiated on the recording medium depending on a rotary angle of the recording medium. According to the laser power control method of the present invention, the laser power can be controlled to an optimum value even if the laser beam is not perpendicularly incident to the recording medium, such as a case where the recording medium is loaded obliquely with respect to a rotary shaft, and it is therefore possible to accurately record and reproduce information with respect to the recording medium.

In the laser power control method, the step (a) may control the laser power of the laser beam for each of sectors dividing a recording surface of the recording medium in a circumferential direction of the recording medium. In this case, it is possible to reduce the number of set values for the laser power, and the circuit scale of an optical information storage unit which employs the laser power control method can be reduced.

In the laser power control method, the step (a) may control the laser power of the laser beam for each of blocks, each of the blocks being made up of a predetermined number of sectors dividing a recording surface of the recording medium in a circumferential direction of the recording medium. In this case, it is possible to reduce the number of set values for the laser power, and the circuit scale of an optical information storage unit which employs the laser power control method can be reduced.

In the laser power control method, the step (a) may control the laser power of the laser beam for each of zones dividing a recording surface of the recording medium in a radial direction of the recording medium. In this case, it is possible to appropriately control the laser power not only when the recording medium is inclined, but also when the recording medium is deformed.

The laser power control method may further comprise the steps of (b) storing set values of the laser power in a memory for each region of the recording medium, and (c) reading the set value from the memory depending on a region of the recording medium irradiated by the laser beam, and switching the laser power of the laser beam depending on the read set value. In this case, it is possible to reduce the memory capacity required to store the set values in the memory, and the circuit scale of an optical information storage unit which employs the laser power control method can be reduced.

The laser power control method may further comprise the steps of (d) writing a test pattern on the recording medium and reading the test pattern from the recording medium, where the step (b) stores the set values depending on the test pattern read from the recording medium. In this case, it is possible to control the laser power for each individual recording medium which is loaded into an optical information storage unit which employs the laser power control method, so that information can be read and written with respect to the recording medium under optimum conditions for the recording medium.

Other objects and further features of the present invention will be apparent from the following detailed description when read in conjunction with the accompanying drawings.

BRIEF DESCRIPTION OF THE DRAWINGS

FIG. 2 is a diagram showing an example of a characteristic of a position of the recording medium with respect to a head position in the reproducing state of the recording medium;

FIG. 10 is a diagram showing a data structure of an embodiment of a set table of the first embodiment;

FIG. 12 is a diagram showing a data structure of an error rate table used in the modification of the embodiment of the read power setting process;

FIG. 18 is a diagram showing a data structure of an embodiment of a read power set table of the second embodiment;

FIG. 23 is a diagram showing a data structure of an embodiment of a laser power set table of the third embodiment.

DESCRIPTION OF THE PREFERRED EMBODIMENTS

Figure 1A:
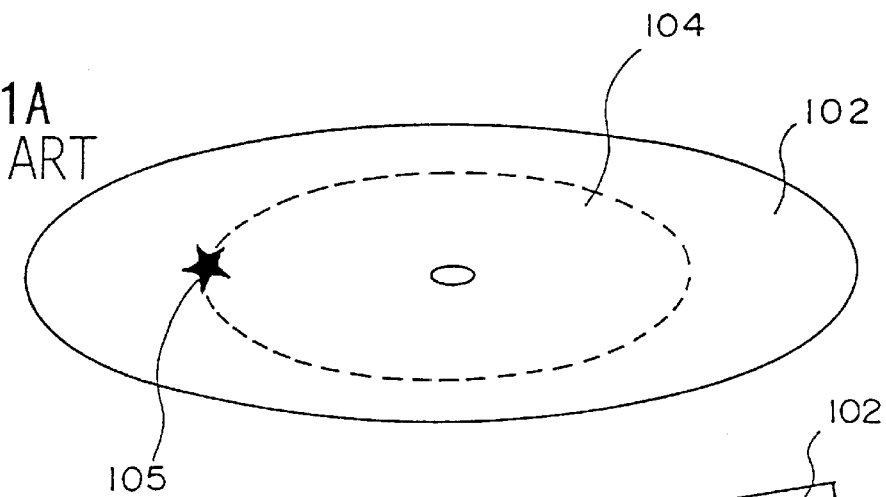
FIGS. 1A and 1B are diagrams showing an example of a conventional recording medium in a reproducing state.
Figure 1B:
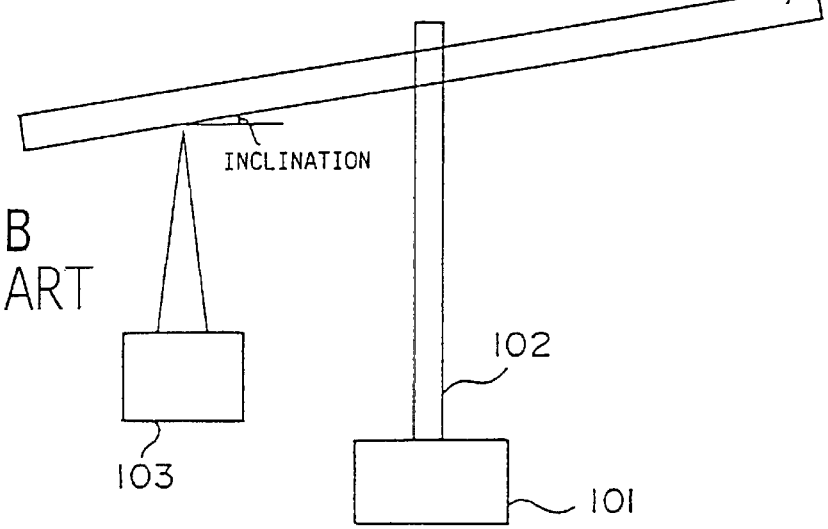
Figure 3A:
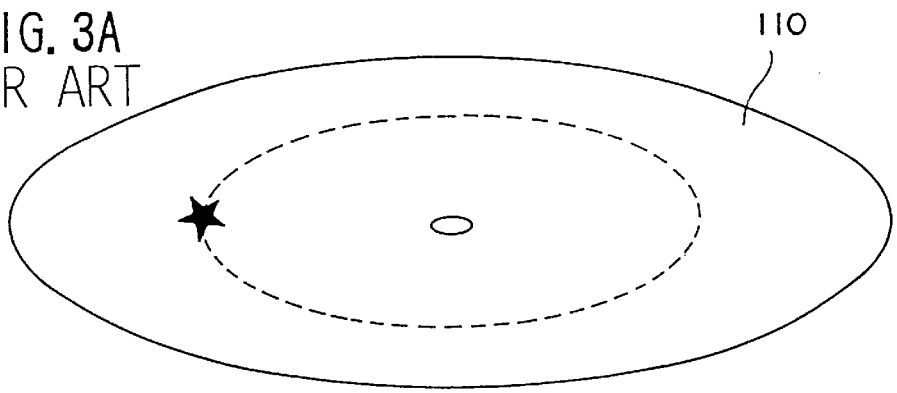
FIGS. 3A and 3B are diagrams showing another example of a conventional recording medium in a reproducing state.
Figure 3B:
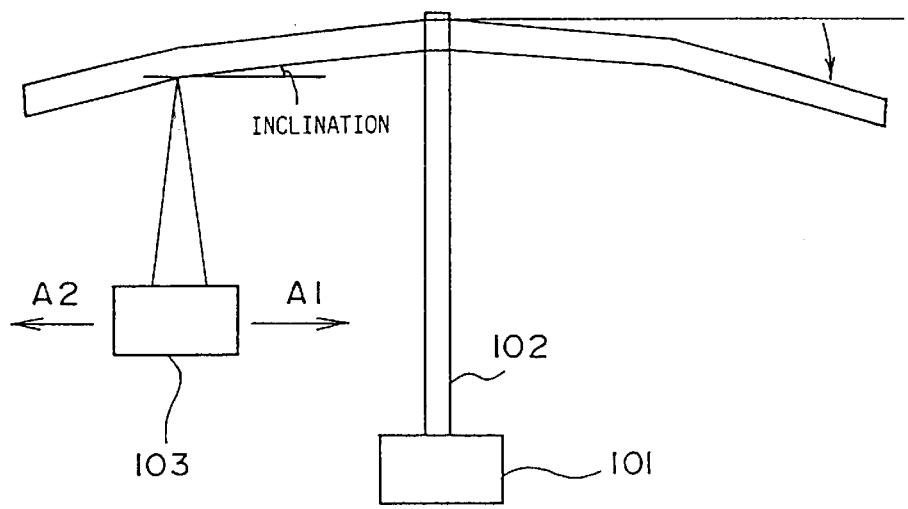
Figure 4:
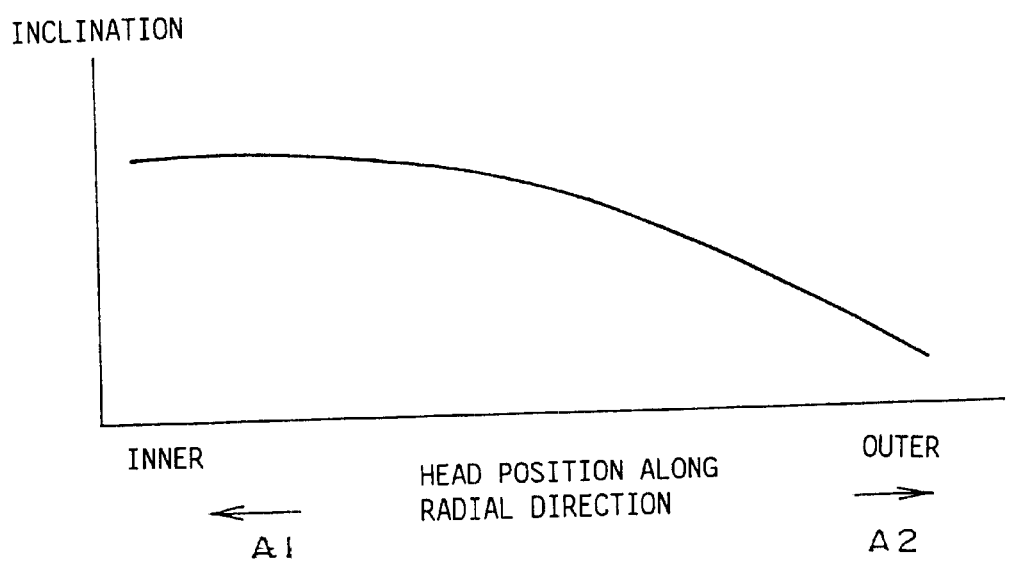
FIG. 4 is a diagram showing an example of a characteristic of an inclination of the recording medium with respect to a head position in the reproducing state of the recording medium.
Figure 5:
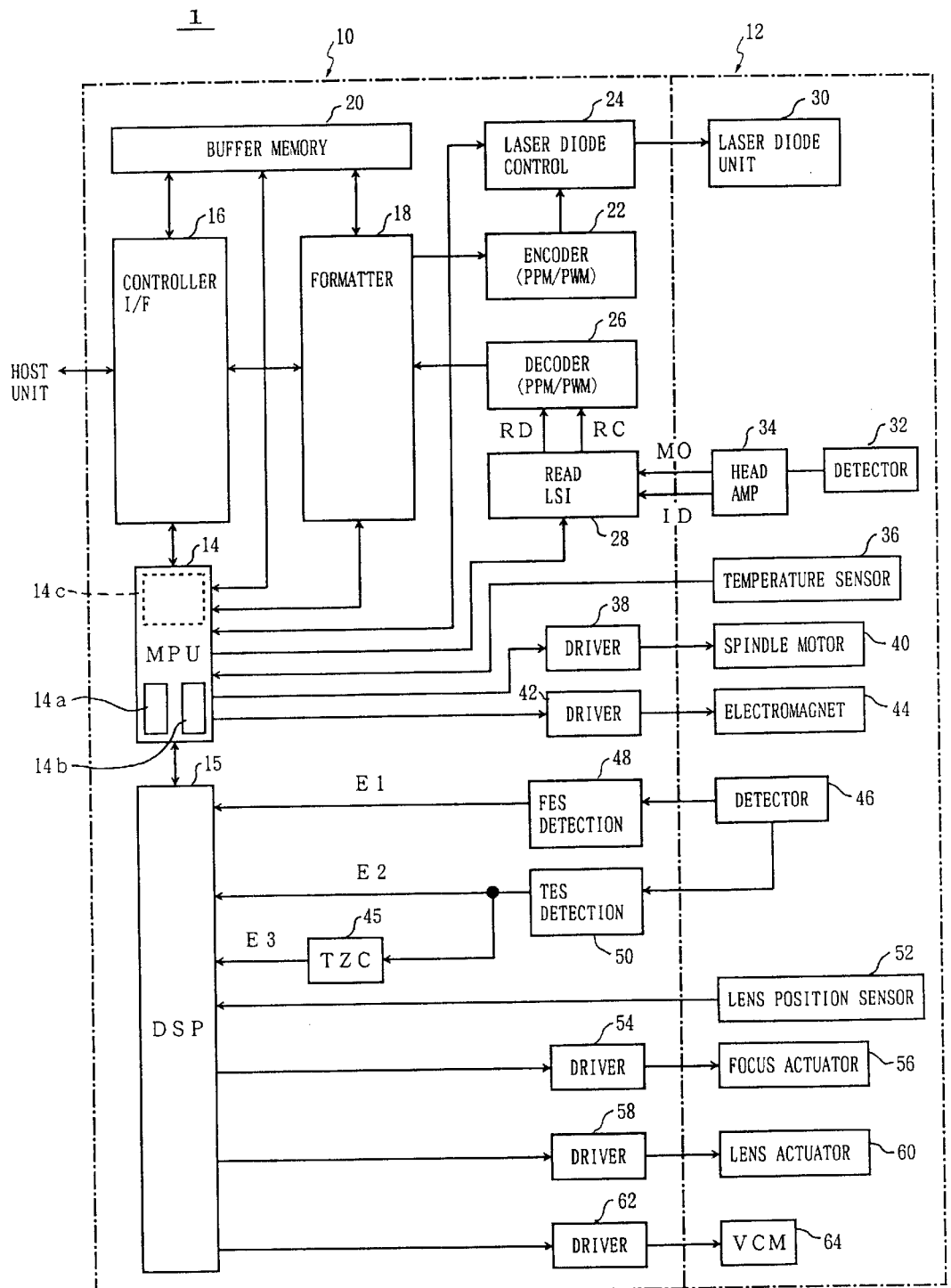
FIG. 5 is a system block diagram showing a first embodiment of the optical information storage unit according to the present invention.

FIG. 5 is a system block diagram showing a first embodiment of the optical information storage unit according to the present invention. In this first embodiment of the optical information storage unit, the present invention is applied to an optical disk unit or an optical disk drive. This first embodiment of the optical information storage unit employs a first embodiment of a laser power control method according to the present invention.

An optical disk drive 1 shown in FIG. 5 generally includes a controller 10 and an enclosure 12. The controller 10 includes a MPU 14 which controls the entire operation of the optical disk drive 1, an interface controller 16 which exchanges commands and data between the optical disk drive 1 and a host unit (not shown), a formatter 18 which carries out a process necessary to read data from and write data to an optical disk medium, and a buffer memory 20 which is used in common among the MPU 14, the interface controller 16 and the formatter 18.

A laser diode control circuit 24 is connected to the formatter 18 via an encoder 22, as a data write system. A control output of the laser diode control circuit 24 is supplied to a laser diode unit 30 which is provided in an optical unit of the enclosure 12, The laser diode unit 30 integrally includes a laser diode and a monitoring light receiving element.

The MPU 14 has an internal memory. A read power set table 14a for controlling a read power for every sector, and a write power set table 14b for controlling a write power for every sector are set within the internal memory of the MPU 14.

The MPU 14 is connected to the laser diode control circuit 24, and controls the laser diode control circuit 24 so that the read power and the write power are controlled depending on set values which are set in the read power set table 14a and the write power set table 14b.

The formatter 18 is also connected to the MPU 14. The MPU 14 recognizes the type of the optical disk medium which is loaded into the optical disk drive 1, that is, whether the storage capacity of the loaded optical disk medium is 128 MB, 230 MN, 540 MB or 640 MB.

Based on a recognition result notified from the MPU 14 indicating the type of the loaded optical disk medium ,the formatter 18 carries out a formatting process corresponding to a pulse position modulation (PPM) recording if the recognition result indicates the 128 MB medium, and carries out a formatting process corresponding to a pulse width modulation (PWM) recording if the recognition result indicates the 230 MB, 540 MB or 640 MB medium.

In addition, a read LSI circuit 28 is connected to the formatter 18 via a decoder 26, as a data read system.

A laser beam emitted from the laser diode unit 30 is reflected by the optical disk medium and is received by a detector 32 provided in the enclosure 12. A detection signal output from the detector 32 is supplied to the read LSI circuit 28 via a head amplifier 34. The detection signal output from the detector 32 includes an identification (ID) signal and a magneto-optical (MO) signal. The read LSI circuit 28 includes functions of circuits such as an automatic gain control (AGC) circuit, filter, sector mark detection circuit, synthesizer and phase locked loop (PLL) circuit. The read LSI circuit 28 generates a read clock and a read data from the ID signal and the MO signal input from the head amplifier 34, and supplies the read clock and the read data to the decoder 26.

A zone constant angular velocity (ZCAV) recording system is employed with respect to the optical disk medium which is rotated by a spindle motor 40. Hence, the MPU 14 controls the switching of a clock frequency in correspondence with the zone with respect to the synthesizer within the read LSI circuit 28.

A modulation system of the encoder 22 and a demodulation system of the decoder 26 are switched depending on the type of the loaded optical disk medium recognized by the MPU 14. In other words, the modulation and demodulation systems are switched to the modulation and demodulation systems of the PPM recording for the 128 MB medium, and are switched to the modulation and demodulation systems of the PWM recording for the 230 MB, 540 MB and 640 MB mediums.

A temperature detection signal from a temperature sensor 36 which is provided in the enclosure 12 is supplied to the MPU 14. Based on an environment temperature of the optical disk drive 1 detected by the temperature sensor 36, the MPU 14 controls light emission powers for the read, write and erase operations, that is, a read power, a write power and an erase power in the laser diode control circuit 24 to optimum values.

In addition, the MPU 14 controls the spindle motor 40 which is provided within the enclosure 12 via a driver 38. Because the recording format of the optical disk medium used in this embodiment is the ZCAV, the spindle motor 40 is controlled to rotate at a constant velocity of 3600 rpm, for example.

Furthermore, the MPU 14 controls electromagnets 44 provided in the enclosure 12, via a driver 42. The electromagnets 44 are respectively provided on a beam irradiating side of the loaded disk medium and the side of the loaded disk medium opposite to the beam irradiating side. The electromagnets 44 apply an external magnetic field on the optical disk medium when carrying out the recording and erasing operations. In optical disk drives which are being developed and employ the so-called magnetic super resolution (MSR), such an external magnetic field is also applied when carrying out a read operation.

A digital signal processor (DSP) 15 carries out a servo function to position the laser beam from the laser diode unit 30 with respect to the loaded disk medium. The DSP 15 receives a focus error signal from a focus error signal (FES) detection circuit 48, and a tracking error signal from a tracking error signal (TES) detection circuit 50.

An optical unit provided within the enclosure 12 includes a detector 46 which receives the reflected light beam from the loaded disk medium. The detector 46 is divided into a plurality of detecting regions, and is constructed so that different signal levels are obtainable from the detecting regions depending on the shape of the reflected light beam irradiated on the detector 46.

The FES detection circuit 48 generates a focus error signal E1 based on detection signals output from the 2-part detector 46. This focus error signal E1 is input to the DSP 15.

On the other hand, the TES detection circuit 50 generates a tracking error signal E2 based on detection signals output from the 2-part detector 46. This tracking error signal E2 is input to the DSP 15 and a track zero crossing (TZC) detection circuit 45. The TZC detection circuit 45 generates a track zero crossing pulse E3, and inputs this track zero crossing pulse E3 to the DSP 15.

Furthermore, a lens position sensor 52 which detects a lens position of an objective lens through which the laser beam is irradiated on the optical disk medium is provided in the enclosure 12. A lens position detection signal E4 output from the lens position sensor 52 is input to the DSP 15. The DSP 15 controls and drives a focus actuator 56, a lens actuator 60 and a voice coil motor (VCM) 64 via drivers 54, 58 and 62, respectively, so as to position the laser beam.

Next, a general description will be given of the enclosure 12 of the optical disk drive 1.

Figure 6:
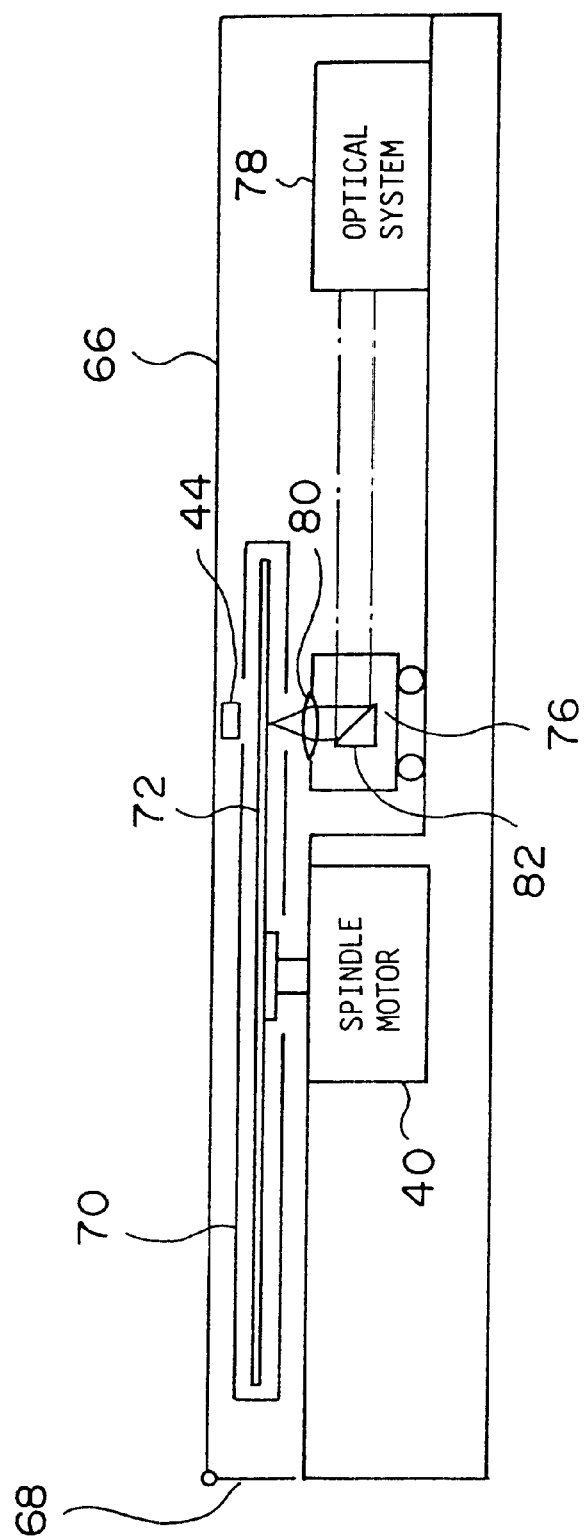
FIG. 6 is a diagram showing the general construction of the first embodiment.

FIG. 6 is a diagram showing the general construction of the first embodiment.

The spindle motor 40 is provided within a housing 66, and a MO cartridge 70 is inserted into the housing 66 via an inlet door 68. The MO cartridge 70 accommodates the optical disk medium, that is, a MO disk 72. Hence, when the cartridge 70 is loaded into the housing 66, the MO disk 72 is loaded with respect to a hub on a rotary shaft of the spindle motor 40.

A carriage 76 is arranged under the MO disk 72 of the loaded cartridge 70. The carriage 76 is freely movable by the VCM 64 in a direction traversing tracks on the MO disk 72. In addition, an objective lens 80 is mounted on the carriage 76. The objective lens 80 receives the laser beam emitted from the laser diode unit 30 which is provided in a fixed optical system 78 via a prism 82, and forms. the beam spot on the recording surface of the MO disk 72.

The objective lens 80 is moved and controlled in an optical axis direction by the focus actuator 56 within the enclosure 12, and controls the focus. In addition, the objective lens 80 is moved and controlled in a direction traversing the tracks on the MO disk 72 by the lens actuator 60, within a range of several tens of tracks, for example, and controls the tracking.

The position of the objective lens 80 mounted on the carriage 76 is detected by the lens position sensor 52 shown in FIG. 5. The lens position sensor 52 outputs a position detection signal having a value 0 at a neutral position where the optical axis of the objective lens 80 extends vertically upwards, and having a value depending on the amount moved from the neutral position with a polarity depending on whether the movement is towards the inner or outer periphery of the MO disk 72.

Figure 7:
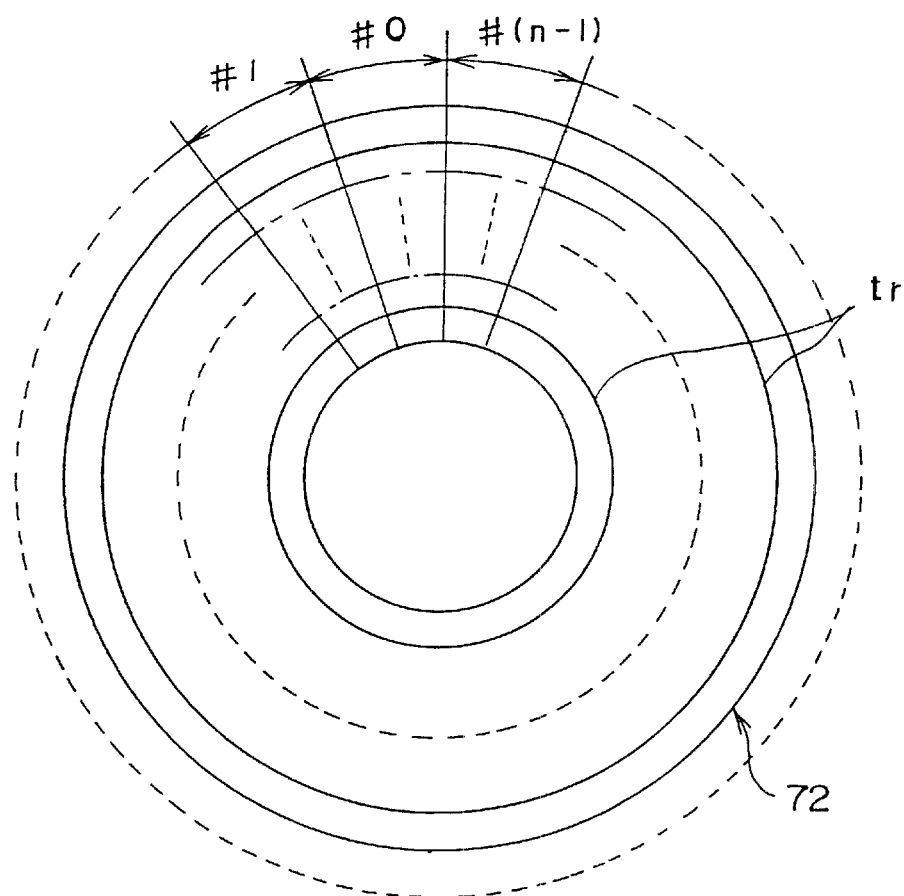
FIG. 7 is a diagram showing a data format of a recording medium used in the first embodiment.

FIG. 7 is a diagram showing a data format of the recording medium, that is, the MO disk 72, used in the first embodiment.

The MO disk 72 has a disk shape, and for example, a plurality of tracks tr are formed concentrically on the recording surface thereof. In addition, the recording surface of the MO disk 72 is divided into n sectors #0 through #(n−1) in the circumferential direction thereof.

Next, a description will be given of a read power setting process carried out by the MPU 14.

Figure 8:
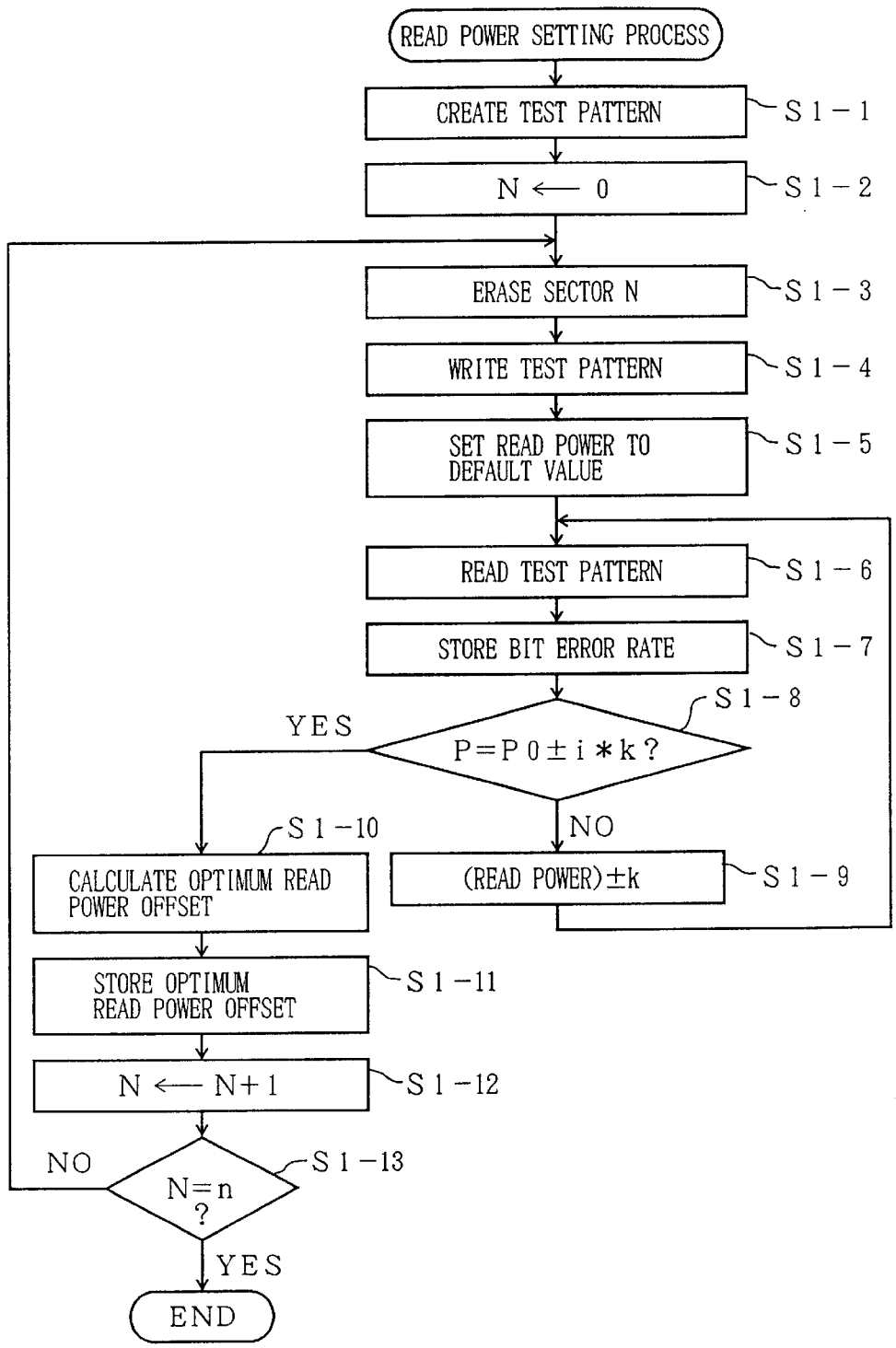
FIG. 8 is a flow chart for explaining an embodiment of a read power setting process of the first embodiment.

FIG. 8 is a flow chart for explaining an embodiment of the read power setting process of the first embodiment. The MPU 14 carries out the read power setting process when the cartridge 70 is loaded or for every predetermined time, for example.

When the read power setting process of the MPU 14 is started, a step S1-1 creates a test pattern and stores the test pattern in the buffer memory 20. A step S1-2 sets "0" to a variable N which is internally set for use in identifying the sector.

A step S1-3 positions the beam spot of the laser beam on a test track which is set in a predetermined region of the MO disk 72, and erases a test target sector N of the test track. After the test target sector N is erased in the step S1-3, a step S1-4 writes on the test target sector N the test pattern which is stored in the buffer memory 20 in the step S1-1. The PPM recording is carried out if the MO disk 72 is a 128 MB or 230 MB medium, and the PWM recording is carried out if the MO disk 72 is a 540 MB or 640 MB medium.

After the test pattern is written on the test target sector N in the step S1-4, a step S1-5 sets a read laser power P of the beam spot to a default value P0, and a step S1-6 reads the test pattern from the test target sector N.

A step S1-7 compares the test pattern read in the step S1-6 with the original test pattern stored in the buffer memory 20 in the step S1-1, calculates a bit error rate e, and stores the calculated bit error rate e in an internal memory of the MPU 20. This bit error rate e can be calculated from the following formula (1), where bit0 denotes a total number of bits of the test pattern, and bit1 denotes a number of bits which do not match between the read test pattern and the original test pattern stored in the buffer memory 20.

$$e = (bit1)/(bit0) \tag{1}$$

When using an error byte number information of an error correction code (ECC) demodulation circuit indicating the number of erroneous bytes, the bit error rate e can be calculated from the following formula (2), where BYTE0 denotes a total number of bytes of the test pattern, and BYTE1 denotes a number of erroneous bytes in the read test pattern with respect to the original test pattern stored in the buffer memory 20.

$$e = (BYTE1)/(BYTE0) \tag{2}$$

After the error rate e is calculated in the step S1-7, a step S1-8 decides whether or not the read power P of the beam spot is $P = P0 \pm i*k$, where P0 denotes the default value of the read power P, and k denotes an offset value, and i denotes an integer. If the decision result in the step S1-8 is NO, a step S1-9 adds ±k to the read power P, and the process returns to the step S1-6, so as to read the test pattern again from the test target sector N.

The steps S1-6 through S1-9 are repeated until bit error rates $e_{0,N}, e_{1,N}, \ldots e_{(i-1),N}$ and $e_{i,N}$ are respectively obtained and stored with respect to the read powers (P0+k), (P0+2k), ..., (P0+(i−1)k) and (P0+ij), and bit error rates $e_{-1,N}, e_{-2,N}, \ldots, e_{-(i-1),N}$ and $e_{-i,N}$ are respectively obtained and stored with respect to the read powers (P0−k), (P0−2k), ..., (P0−(i−1)k) and (P0−ik).

By repeating the steps S1-6 through S1-9 described above, it is possible to obtain a characteristic of the error rate with respect to the read power in the sector N.

Figure 9:
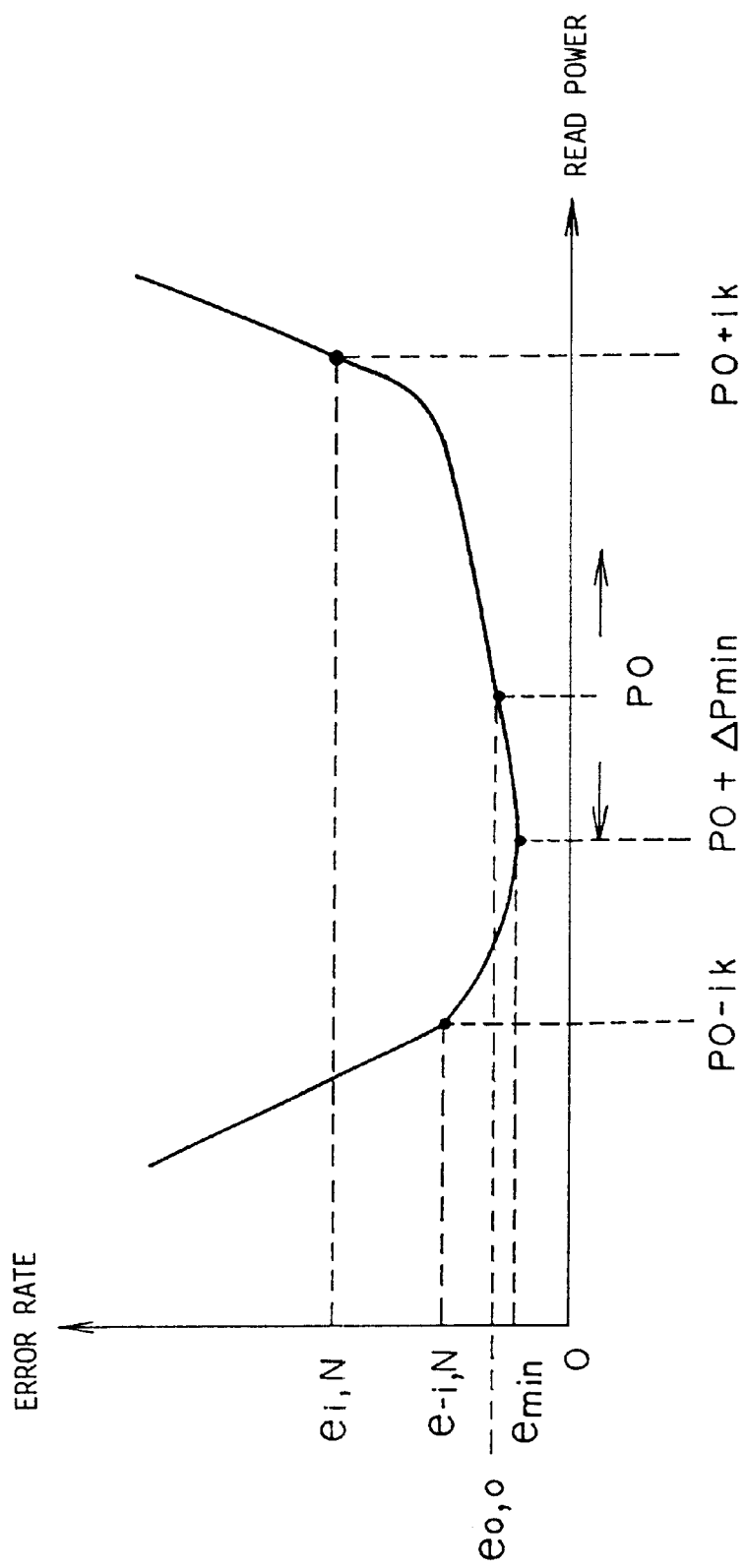
FIG. 9 is a diagram for explaining an embodiment of a method of determining an optimum read power.

FIG. 9 is a diagram for explaining an embodiment of a method of determining an optimum read power. More particularly, FIG. 9 shows a characteristic of the error rate with respect to the read power in the first embodiment.

As shown in FIG. 9, the error rate changes in a range of $e_{min}$ to $e_{i,N}$ in a range of the read power from (P0−ik) to (P0+ik), and an approximately U-shaped characteristic is obtained. In FIG. 9, a read power (P0+ΔP$_{min}$) at which the minimum error rate $e_{min}$ is obtained corresponds to the optimum read power.

A step S1-10 calculates an optimum read power offset value ΔP$_{min}$, and a step S1-11 stores the calculated optimum read power offset value ΔP$_{min}$ in the read power set table 14a. In other words, the MPU 14 selects the minimum error rate from among the stored error rates obtained by the steps S1-6 through S1-9, and stores the optimum read power offset value ΔP$_{min}$ in the read power set table 14a which is used to set the read power of the sector N.

Next, a step S1-12 increments N by 1, and a step S1-13 decides whether or not N=n. The process returns to the step S1-3 if the decision result in the step S1-13 is NO, but the process ends if the decision result in the step S1-13 is YES. In other words, the variable N which is used to identify the sector is successively incremented by 1, and the steps S1-3 through S1-11 are repeated until the variable N becomes equal to the number n of sectors set with respect to the MO disk 72. In addition, the optimum read power offset value ΔP$_{min}$ is obtained with respect to all of the sectors #0 through #(n−1) set for the MO disk 72, and are stored in the read power set table 14a.

FIG. 10 is a diagram showing a data structure of an embodiment of the read power set table 14a of the first embodiment.

For example, the read power set table 14a is set in the internal memory of the MPU 13. If the MO disk 72 is divided into the n sectors #0 through #(n−1) as shown in FIG. 7, the read power offset values ΔP0 through ΔP(n−1) are respectively set with respect to the sectors #0 through #(n−1) in the read power set table 14a. The read power offset values ΔP0 through ΔP(n−1) are respectively set with respect to the sectors #0 through #(n−1) in the read power set table 14a by the read power setting process shown in FIG. 8.

When reading the data from the MO disk 72, the read power is controlled based on the read power offset values ΔP0 through ΔP(n−1) set in the read power set table 14a.

In this embodiment of the read power setting process, the error rate is only measured once with respect to each read power. However, it is possible to repeat the measurement of the error rate a plurality of times, and to obtain an average value of the measured error rates. In this case, it is possible to accurately measure the error rate, and the read power can be controlled with a high accuracy. In addition, it is possible to further improve the accuracy of measuring the error rate by changing the test pattern, so as to control the read power with a high accuracy.

In this embodiment, the optimum read power offset value is obtained and set for each sector. However, it is possible to obtain the error rates for all of the sectors, store the error rates in an error rate table, and obtain the optimum read power offset value depending on the error rate stored in the error rate table.

Figure 11:
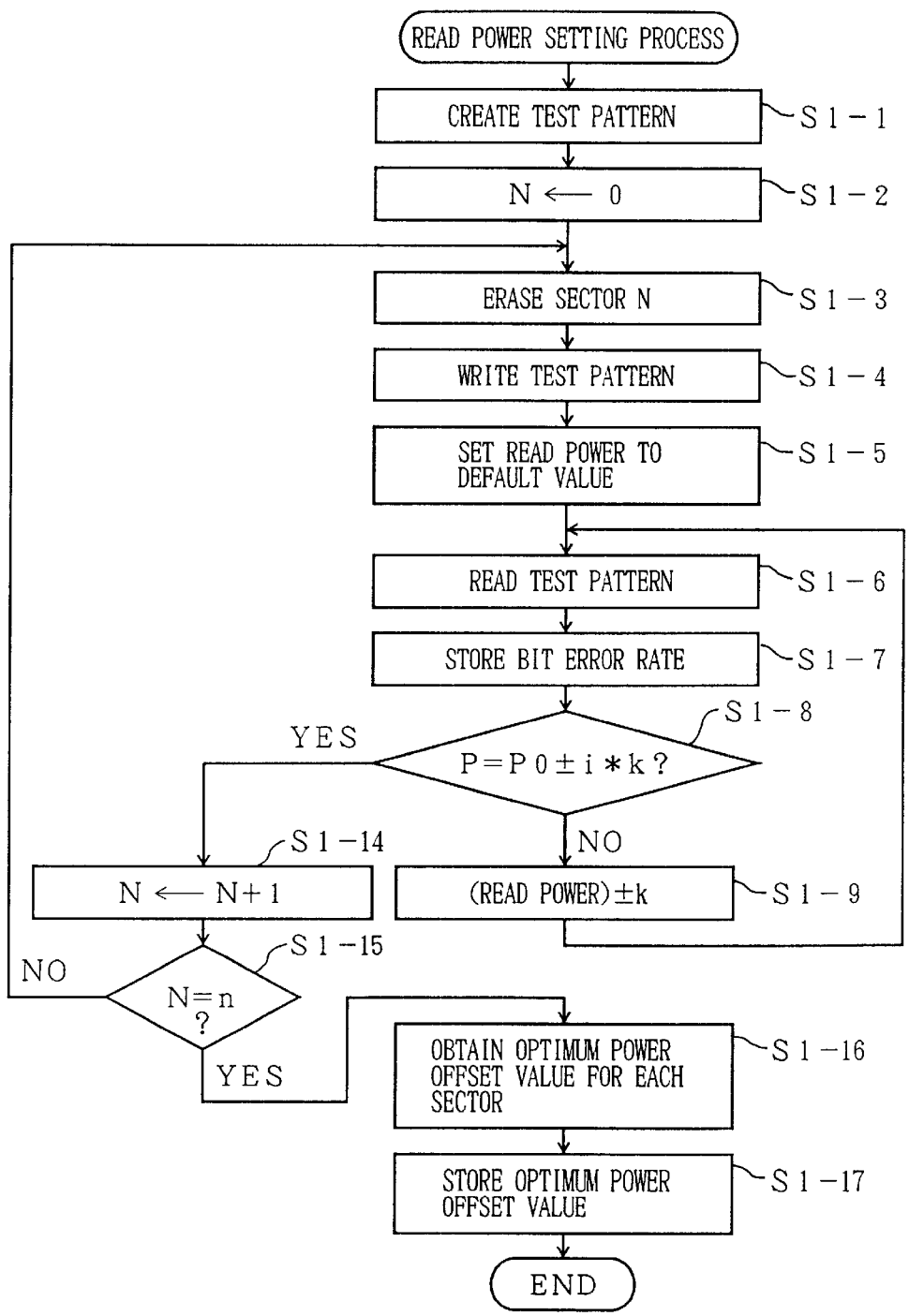
FIG. 11 is a flow chart for explaining a modification of the embodiment of the read power setting process.

FIG. 11 is a flow chart for explaining a modification of the embodiment of the read power setting process of the first embodiment. In FIG. 11, those steps which are the same as those corresponding steps in FIG. 8 are designated by the same reference numerals, and a description thereof will be omitted.

In this modification, the error rates are obtained for all of the sectors, the error rates are stored in an error rate table 14c, and the optimum read power offset value is obtained depending on the error rate stored in the error rate table 14c.

In this modification, the bit error rates obtained and stored by repeating the steps S1-6 through S1-9 at a predetermined test target sector. After the error rates with respect to the predetermined test target sector are stored, a step S1-14 increments the variable N which is used to identify the test target sector by 1, and a step S1-15 decides whether or not N=n. The process returns to the step S1-3 if the decision result in the step S1-15 is NO, and the process advances to a step S1-16 if the decision result in the step S1-15 is YES. Hence, if the decision result in the step S1-15 is NO, the steps S1-6 through S1-9 are repeated with respect to the next test target sector, so as to obtain and store the error rates with respect to this next test target sector. Such an operation is repeated until the variable N becomes equal to the total number n of the sectors on the MO disk 72. For example, the error rate table 14c is set in the internal memory of the MPU 14.

FIG. 12 is a diagram showing a data structure of the error rate table 14c used in this modification of the embodiment of the read power setting process.

The error rate table 14c is constructed so that the error rate is stored for each of the sectors #0 through #(n−1) set in the step S1-9. In addition, the error rate table 14c is constructed so that the error rate is set for each read power offset value set in the steps S1-5 and S1-9.

For example, if the error rate is $e_{0,0}$ when the sector #0 is read at the default power P0 and the read power offset value "0", the error rate $e_{0,0}$ is stored in the error rate table 14c at the sector #0 with the read power offset value "0". Moreover, if the error rate is $e_{(i+1),(n-1)}$ when the sector #(n−1) is read at the read power P0+((i−1)*k) and the read power offset value "(i−1)*k", the error rate $e_{(i+1),(n-1)}$ is stored in the error rate table 14c at the sector #(n−1) with the read power offset value "(i−1)*k".

The error rate table 14c shown in FIG. 12 is created by repeating the steps S1-3 through S1-15. In this modification, the step S1-16 obtains the read power offset value which makes the error rate a minimum from the error rate table 14c for each of the sectors #0 through #(n−1) after the error rate table 14c is created. In addition, a step S1-17 stores each read power offset value which makes the error rate the minimum in the read power set table 14a. Therefore, it is possible to generate the read power set table 14a which is similar to that shown in FIG. 10.

When a read command is supplied from the host unit, the read power is controlled depending on the read power offset value set in the read power set table 14a.

Next, a description will be given of the operation during a read process.

Figure 13:
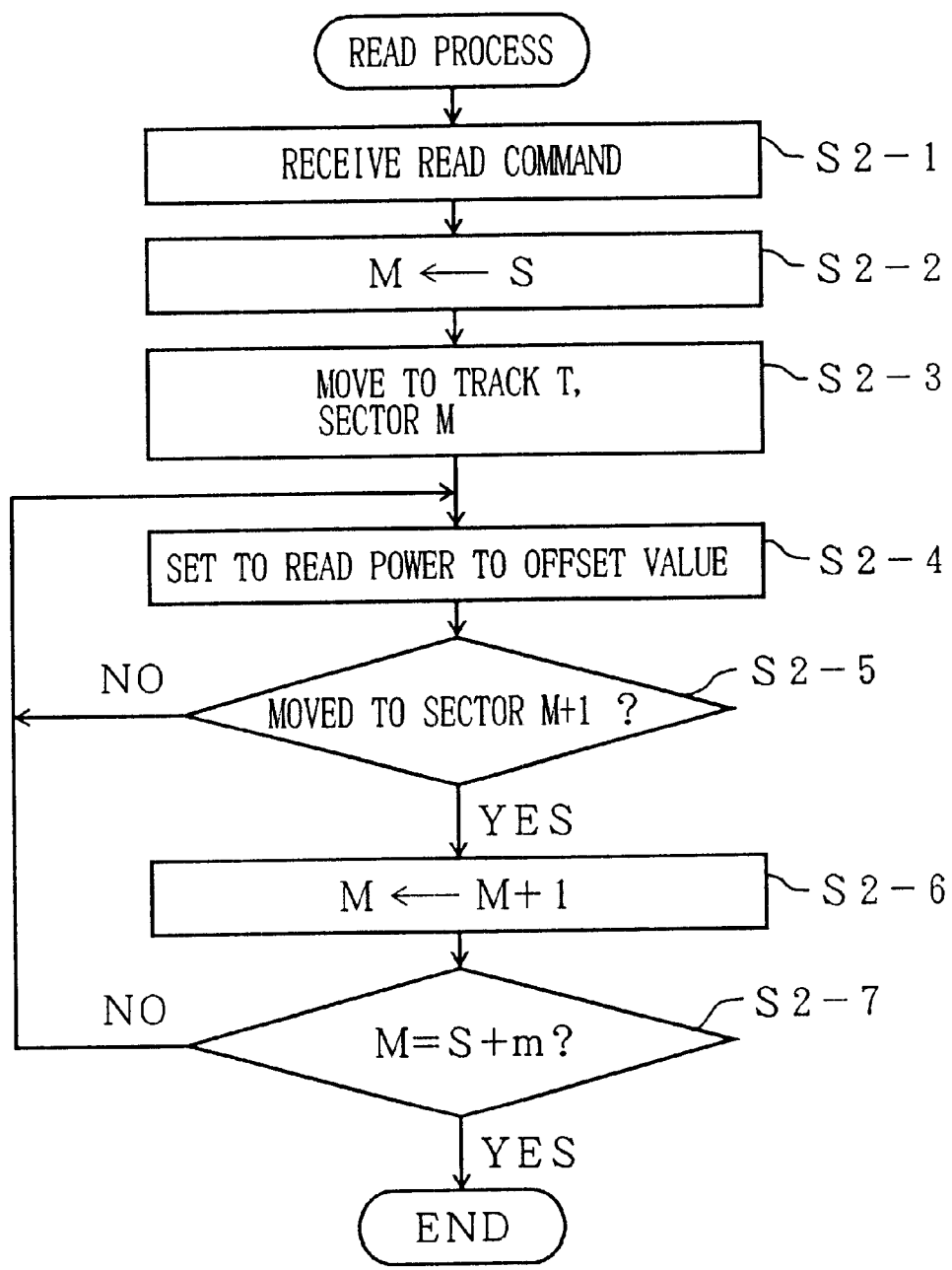
FIG. 13 is a flow chart for explaining an embodiment of a read process of the first embodiment.

FIG. 13 is a flow chart for explaining an embodiment of the read process of the first embodiment.

In FIG. 13, a step S2-1 receives the read command from the host unit when the read process is started. For example, the read command from the host unit requests reading of data amounting to m sectors from a sector S of a track T.

A step S2-2 substitutes the sector S specified in the step S2-1 into a sector M. A step S2-3 carries out a control so that the beam spot moves to the sector M of the track T.

After the beam spot is moved to the sector M of the track T in the step S2-3, a step S2-4 reads the read power offset value stored in the read power set table 14a at a position corresponding to the sector M of the track T, and sets the read power offset value as the output laser power of the beam spot. The output laser power of the beam spot is set to an optimum value, that is, the read power offset value stored in the read power set table 14a.

Next, a step S2-5 decides whether or not the beam spot moved to a next sector M+1. The process returns to the step S2-4 if the decision result in the step S2-5 is NO. On the other hand, if the decision result in the step S2-5 is YES, a step S2-6 sets M to M+1. Then, a step S2-7 decides whether or not M=S+m. The read process ends if the decision result in the step S2-7 is YES, because the beam spot has scanned and read the data amounting to m sectors from the sector S.

On the other hand, the process returns to the step S2-4 if the decision result in the step S2-7 is NO. In this case, the step S2-4 reads from the read power set table 14a the read power offset value depending on the sector M (=S+1), and controls the laser power of the beam spot.

Therefore, since the laser power of the beam spot is controlled based on the read power offset value which is set beforehand in the read power set table 14a, it is possible to read the data at the optimum read power.

A write power setting process can be carried out similarly to the read power setting process described above. When carrying out a write process, the write power is controlled depending on a set value set by the write power setting process.

Figure 14:
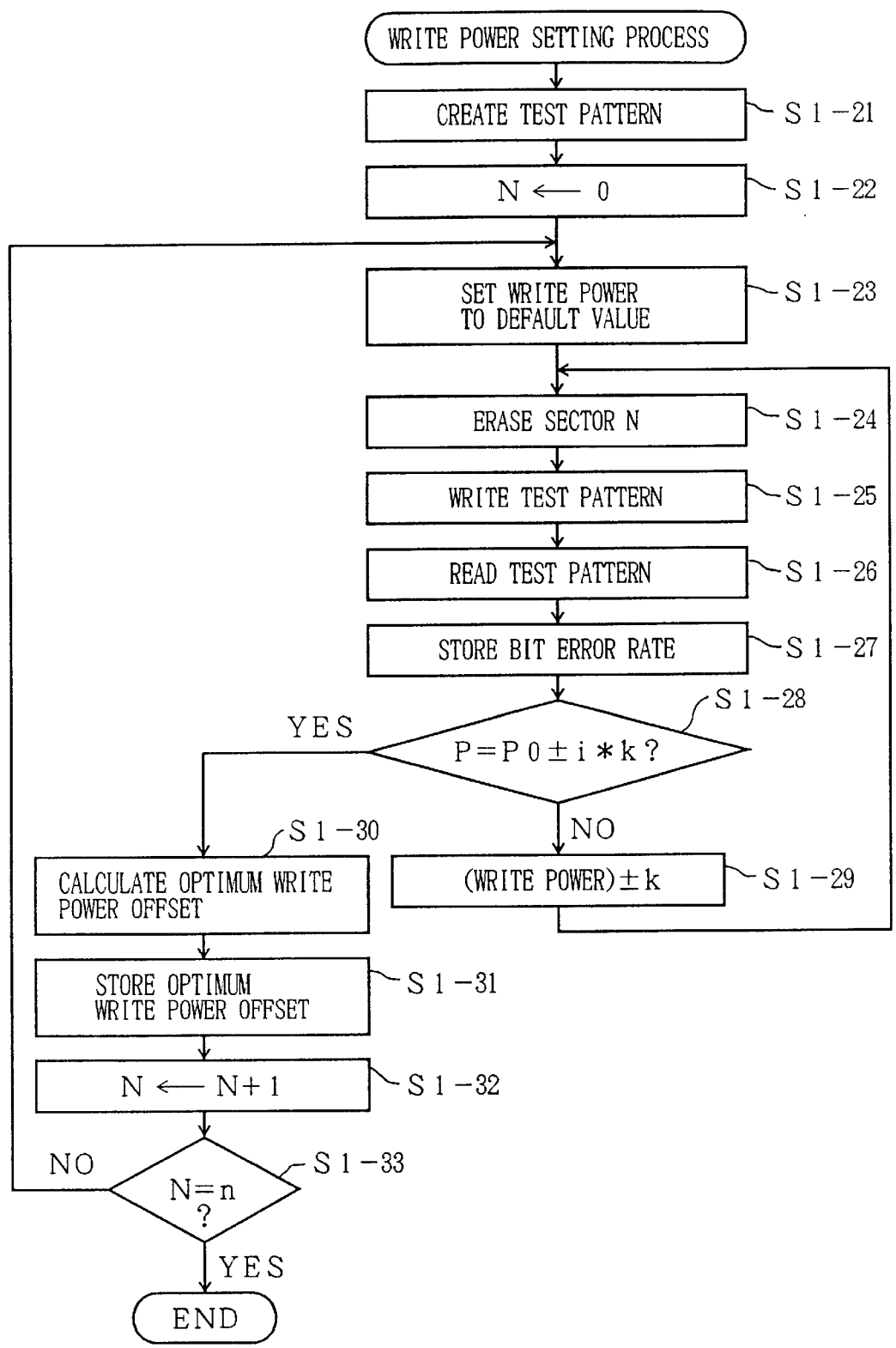
FIG. 14 is a flow chart for explaining an embodiment of a write power setting process of the first embodiment.

FIG. 14 is a flow chart for explaining an embodiment of the write power setting process of the first embodiment. The MPU 14 carries out the write power setting process when the cartridge 70 is loaded or for every predetermined time, for example.

When the write power setting process of the MPU 14 is started, a step S1-21 creates a test pattern and stores the test pattern in the buffer memory 20. A step S1-22 sets "0" to a variable N which is internally set for use in identifying the sector. A step S1-23 sets the write power to a default value.

A step S1-24 positions the beam spot of the laser beam on a test track which is set in a predetermined region of the MO disk 72, and erases a test target sector N of the test track. After the test target sector N of the test track is erased by the step S1-24, a step S1-25 writes on the test target sector N the test pattern which is stored in the buffer memory 20 in the step S1-21. The PPM recording is carried out if the MO disk 72 is a 128 MB or 230 MB medium, and the PWM recording is carried out if the MO disk 72 is a 540 MB or 640 MB medium.

After the test pattern is written on the test target sector N in the step S1-25, a step S1-26 reads the test pattern from the test target sector N.

Similarly as in the case of the read power setting process described above, a step S1-27 compares the test pattern read in the step S1-26 with the original test pattern stored in the buffer memory 20 in the step S1-21, calculates a bit error rate e, and stores the calculated bit error rate e in an internal memory of the MPU 20.

After the error rate e is calculated in the step S1-27, a step S1-28 decides whether or not the write power P of the beam spot is P=P±i*k, where P0 denotes the default value of the write power P, and k denotes an offset value, and i denotes an integer. If the decision result in the step S1-28 is NO, a step S1-29 adds ±k to the write power P, and the process returns to the step S1-24, so as to again carry out the operation of erasing the test track, writing the test pattern and reading the test pattern.

The steps S1-24 through S1-29 are repeated until bit error rates $e_{0,N}, e_{1,N}, \ldots, e_{(i-1),N}$ and $e_{i,N}$ are respectively obtained and stored with respect to the write powers (P0+k), (P0+2k), ..., (P0+(i−1)k) and (P0+ij), and bit error rates $e_{-1,N}, e_{-2,N}, \ldots, e_{(-(i-1)),N}$ and $e_{-i,N}$ are respectively obtained and stored with respect to the write powers (P0−k), (P0−2k), ..., (P0−(i−1)k) and (P0−ik).

By repeating the steps S1-24 through S1-29 described above, it is possible to obtain a characteristic of the error rate with respect to the write power in the sector N.

If the decision result in the step S1-28 is YES, a step S1-30 obtains the write power offset value which makes the error rate a minimum from among the error rates obtained and stored by the steps S1-24 through S1-29. In addition, a step S1-31 stores each write power offset value $\Delta P_{min}$ which makes the error rate the minimum in the write power set table 14b which sets the write power in the sector N. Therefore, it is possible to generate the write power set table 14b which is similar in construction to the read power set table 14a shown in FIG. 10. The illustration of the write power set table 14b will be omitted since the construction thereof is similar to the read power set table 14a.

A step S1-32 increments the variable N which is used to identify the test target sector by 1, and a step S1-33 decides whether or not N=n. The process returns to the step S1-23 if the decision result in the step S1-33 is NO, and the process advances ends if the decision result in the step S1-33 is YES. Hence, the variable N is successively incremented and the steps S1-23 through S1-31 are repeated until the variable N becomes equal to the number n of sectors set with respect to the MO disk 72, so as to obtain an store in the write power set table 14b the optimum write power offset values with respect to all of the sectors #0 through #(n−1) set in the MO disk 72.

Of course, the method of obtaining the write power set value is not limited to that described above. For example, it is possible to obtain the write power set value by a method proposed in a U.S. patent application Ser. No. 763,621 filed Dec. 4, 1996, in which the assignee is the same as that of this application, the disclosure of which is hereby incorporated by reference. The contents of the U.S. patent application Ser. No. 763,621 may also be found in corresponding Japanese Laid-Open Patent Application No. 9-293259.

Furthermore, similarly as in the case of the read power setting process, it is possible to obtain the error rates for all of the sectors and store the error rates in an error rate table, and then obtain the optimum write power offset value depending on the error rate stored in the error rate table.

Figure 15:
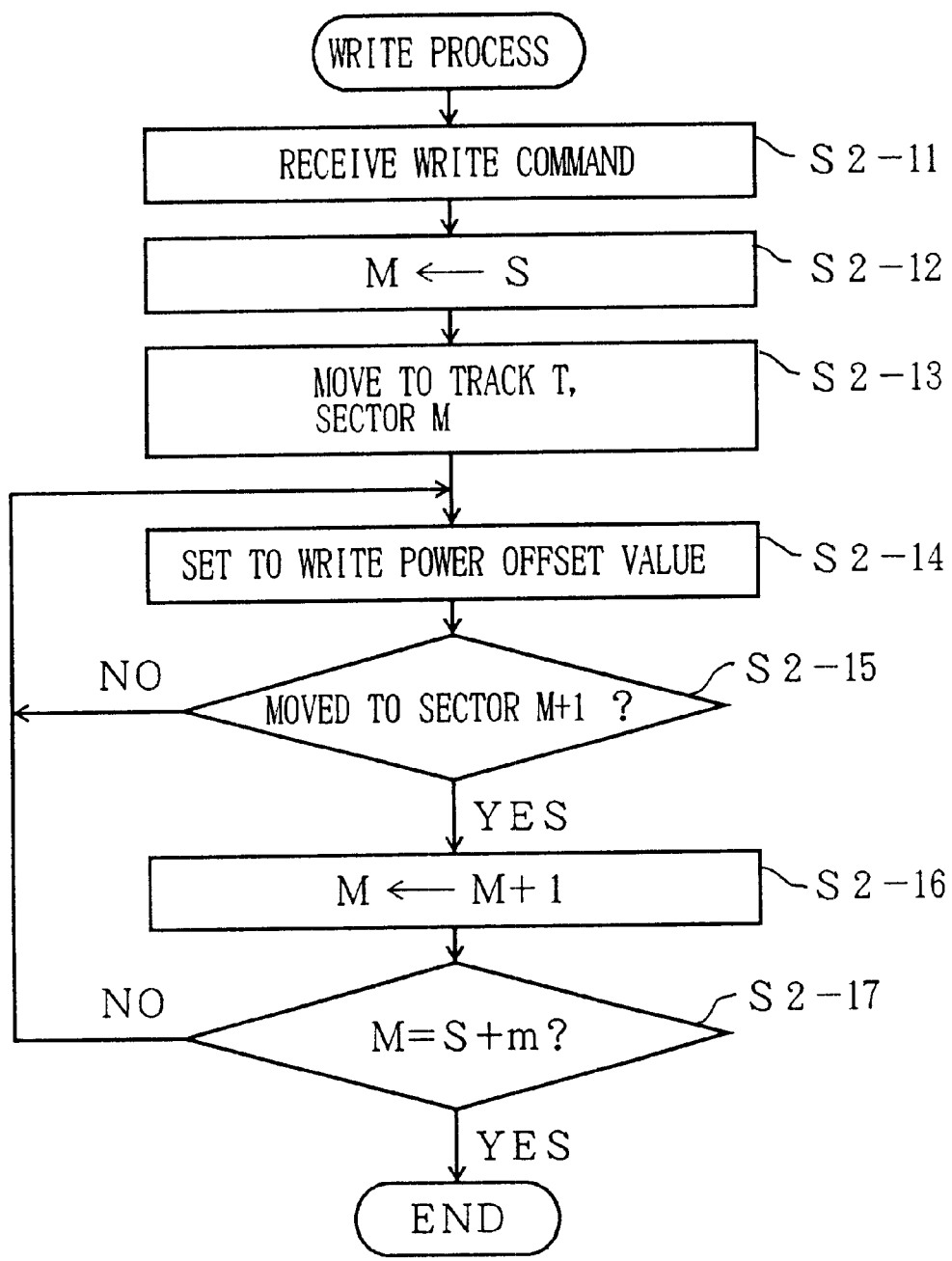
FIG. 15 is a flow chart for explaining an embodiment of a write process of the first embodiment.

FIG. 15 is a flow chart for explaining an embodiment of the write process of the first embodiment.

In FIG. 13, a step S2-11 receives a write command from the host unit when the write process is started, similarly to the case of the read process described above. For example, the write command from the host unit requests writing of data amounting to m sectors from a sector S of a track T.

A step S2-12 substitutes the sector S specified in the step S2-11 into a sector M. A step S2-13 carries out a control so that the beam spot moves to the sector M of the track T.

After the beam spot is moved to the sector M of the track T in the step S2-13, a step S2-14 reads the write power offset value stored in the write power set table 14b at a position corresponding to the sector M of the track T, and sets the write power offset value as the output laser power of the beam spot. The output laser power of the beam spot is set to an optimum value, that is, the write power offset value stored in the write power set table 14b.

Next, a step S2-15 decides whether or not the beam spot moved to a next sector M+1. The process returns to the step S2-14 if the decision result in the step S2-15 is NO. On the other hand, if the decision result in the step S2-15 is YES, a step S2-16 sets M to M+1. Then, a step S2-17 decides whether or not M=S+m. The write process ends if the decision result in the step S2-17 is YES, because the beam spot has scanned and written the data amounting to m sectors from the sector S.

On the other hand, the process returns to the step S2-14 if the decision result in the step S2-17 is NO. In this case, the step S2-14 reads from the write power set table 14b the write power offset value depending on the sector M (=S+1), and controls the laser power of the beam spot.

Therefore, since the laser power of the beam spot is controlled based on the write power offset value which is set beforehand in the write power set table 14b, it is possible to write the data at the optimum write power.

This embodiment controls the laser power of the beam spot based on the laser power offset value which is optimized and set for each sector. Hence, the laser power of the beam spot formed on the recording medium can be controlled to an optimum value for each sector. Even if the recording surface of the recording medium is not perpendicular to the rotary shaft of the spindle motor which rotates the recording medium, the optimum laser power offset value is measured in this state and stored in the laser power set table. Accordingly, the laser power of the beam spot can be controlled based on the laser power offset value read from the laser power set table depending on the sector, thereby making it possible to positively read the data from and write the data to the recording medium.

In this embodiment, the read power set table 14a and the write power set table 14b are set for each sector. However, each sector can be divided into a predetermined number of zones in a radial direction of the recording medium, and the laser power offset value can be set in the read power set table 14a and the write power set table 14b for each zone. In this case, it is possible to control the laser power of the beam spot based on the laser power offset values read from the read power set table 14a and the write power set table 14b depending on the sector and zone.

Figure 16:
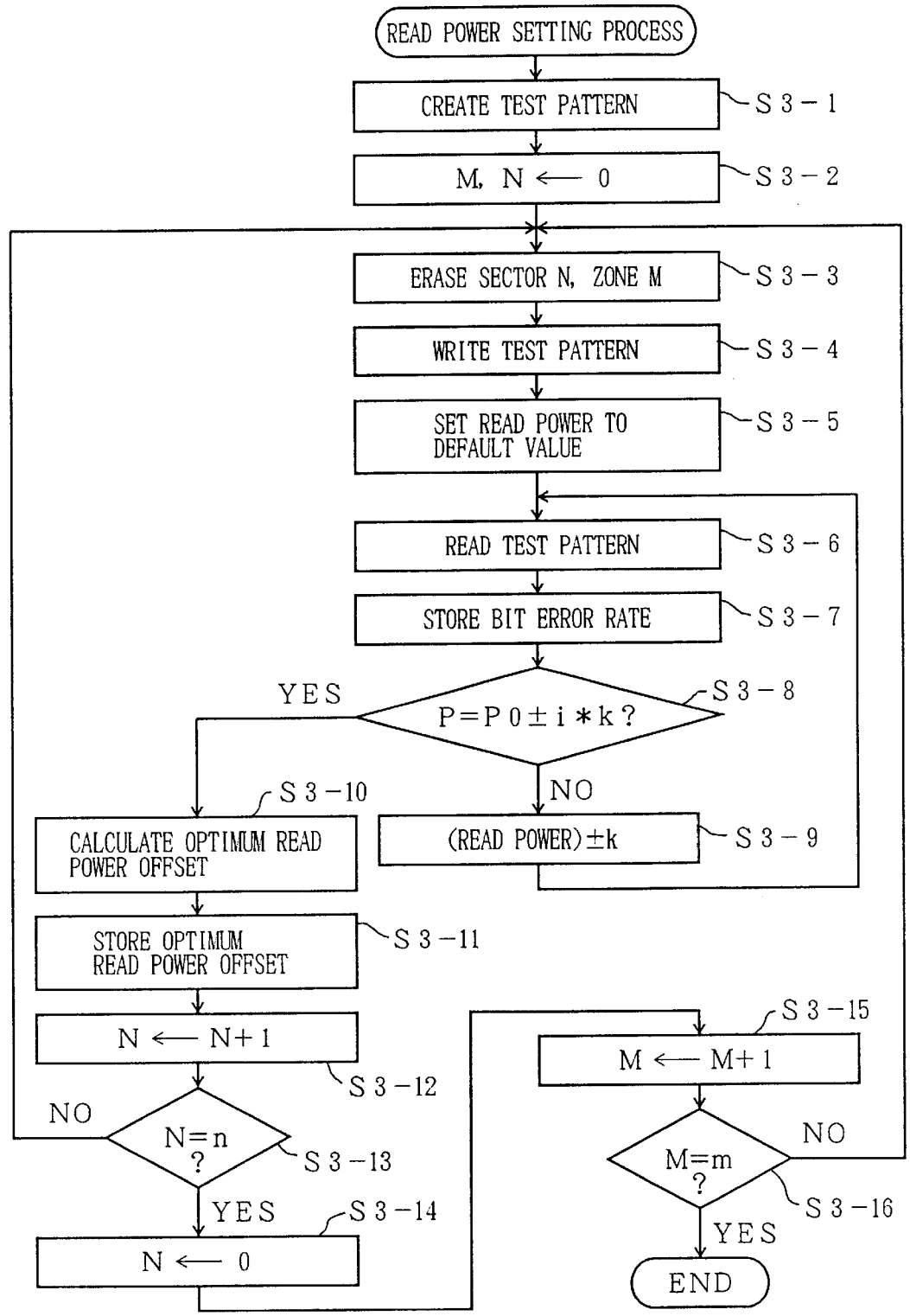
FIG. 16 is a flow chart for explaining an embodiment of the read power setting process of a second embodiment of the optical information storage unit according to the present invention.

FIG. 16 is a flow chart for explaining an embodiment of the read power setting process of a second embodiment of the optical information storage unit according to the present invention. The construction of this second embodiment of the optical information storage unit may be the same as that of the first embodiment shown in FIGS. 5 and 6 described above, and an illustration thereof will be omitted. This second embodiment of the opticalo information storage unit employs a second embodiment of the laser power control method according to the present invention.

In this embodiment, the laser power is controlled for each zone, in addition to each sector. For this reason, the read power set process of this embodiment differs from that of the first embodiment described above.

In FIG. 16, when the read power setting process of the MPU 14 is started, a step S3-1 creates a test pattern and stores the test pattern in the buffer memory 20. A step S3-2 sets "0" to a variable N which is internally set for use in identifying the sector, and to a variable M which is internally set for use in identifying the zone.

Figure 17:
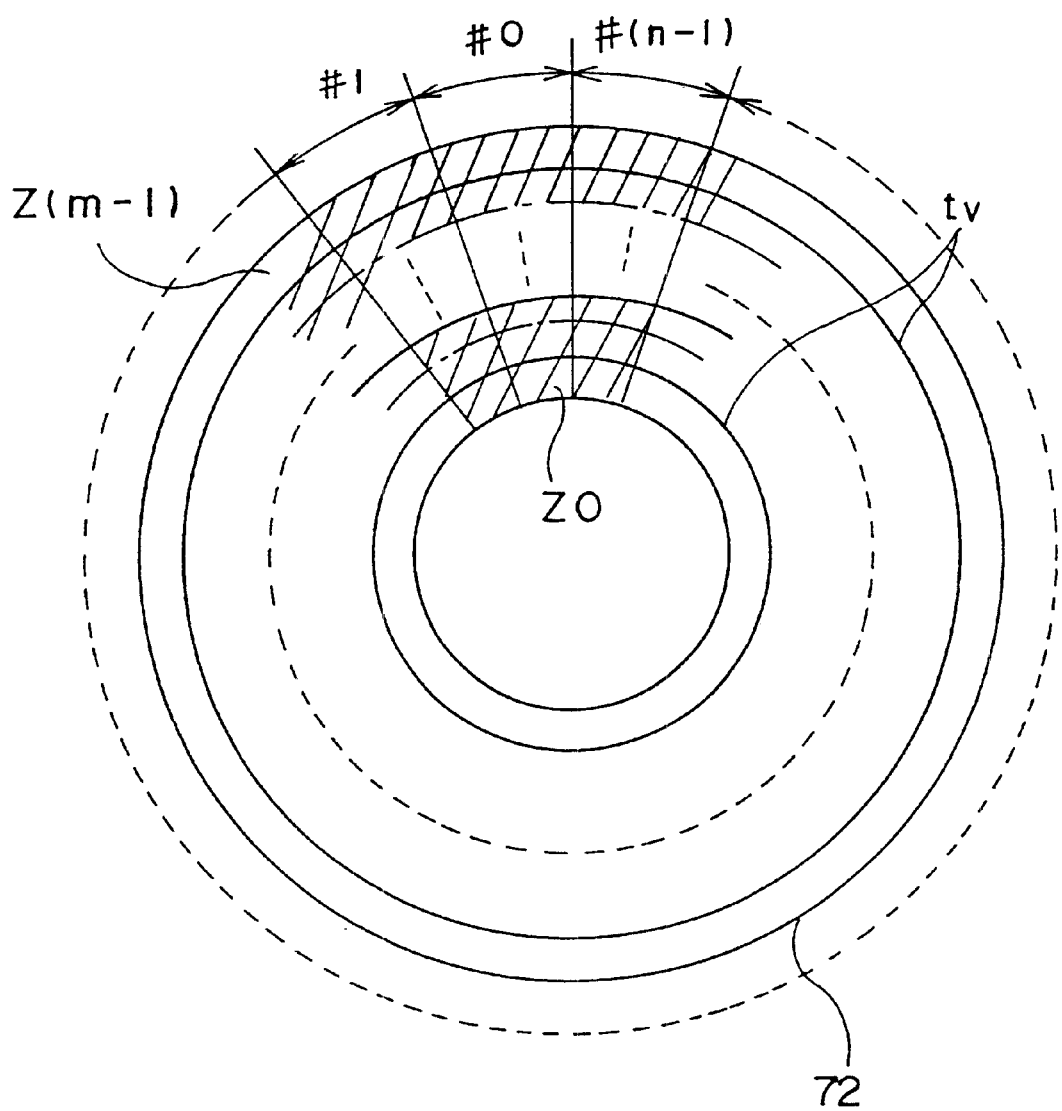
FIG. 17 is a diagram showing a data format of the recording medium used in the second embodiment.

FIG. 17 is a diagram showing a data format of the recording medium used in this second embodiment. In this embodiment, the MO disk 72 is divided into n sectors #0 through #(n−1) in the circumferential direction, and further, the MO disk 72 is divided into m zones Z0 through Z(m−1) in the radial direction.

A step S3-3 erases a sector N of a zone M of a predetermined track on the MO disk 72, and a step S3-4 writes on the sector N of the zone M the test pattern which is stored in the buffer memory 20 in the step S3-1. Thereafter, a step S3-5 sets a read laser power p of the beam spot to a default value p0, and a step S3-6 reads the test pattern from the sector N of the zone M. A step S3-7 calculates a bit error rate e, and stores the calculated bit error rate e in an internal memory of the MPU 20.

After the error rate e is calculated in the step S3-7, a step S3-8 decides whether or not the read power p of the beam spot is p=p0±i*k, where p0 denotes the default value of the read power p, and k denotes an offset value, and i denotes an integer. If the decision result in the step S3-8 is NO, a step S3-9 adds ±k to the read power p, and the process returns to the step S3-6.

The steps S3-6 through S3-9 are repeated until the bit error rates e are respectively obtained and stored with respect to each of the read powers.

If the decision result in the step S3-8 is YES, a step S3-10 calculates an optimum read power offset value $\Delta p_{min}$, and a step S3-11 stores the calculated optimum read power offset value $\Delta p_{min}$ in the read power set table 14a. In other words, the MPU 14 selects the minimum error rate from among the stored error rates obtained by the steps S3-6 through S3-9, and stores the optimum read power offset value $\Delta p_{min}$ in the read power set table 14a which is used to set the read power of the sector N.

Next, a step S3-12 increments N by 1, and a step S3-13 decides whether or not N=n. The process returns to the step S3-3 if the decision result in the step S3-13 is NO, but the process advances to a step S3-14 if the decision result in the step S3-13 is YES. In other words, the variable N which is used to identify the sector is successively incremented by 1, and the steps S3-3 through S3-13 are repeated until the variable N becomes equal to the number n of sectors set with respect to the MO disk 72. In addition, the optimum read power offset value $\Delta p_{min}$ is obtained with respect to all of the sectors #0 through #(n−1) of the zone M set for the MO disk 72, and are stored in the read power set table 14a.

On the other hand, if the decision result in the step S3-13 is YES, a step S3-14 resets N to 0, and a step S3-15 increments M to M+1. Further, a step S3-16 decides whether or not M=m, and the process returns to the step S3-3 if the decision result in the step S3-16 is NO. The process ends if the decision result in the step S3-16 is YES. Hence, the steps S3-3 through S3-15 are repeated until the variable M becomes equal to the number m of zones set with respect to the MO disk 72.

Therefore, the read power offset value is set in the read power set table 14a for each sector and each zone.

FIG. 18 is a diagram showing a data structure of an embodiment of the read power set table 14a of the second embodiment.

For example, the read power set table 14a is set in the internal memory of the MPU 13. If the MO disk 72 is divided into the n sectors #0 through #(n−1) and m zones Z0 through Z(m−1) as shown in FIG. 17, the read power set table 14a includes set regions A0 through A(n−1) respectively with respect to the sectors #0 through #(n−1), and read power offset values $\Delta p_{0,0}$ to $\Delta p_{0,(m-1)}$, through $\Delta p_{(n-1),0}$ to $\Delta p_{(n-1),(m-1)}$ are respectively set in the set regions A0 through A(n−1) with respect to the zones Z0 through Z(m−1), as shown in FIG. 18.

Next, a description will be given of the read process of this second embodiment.

Figure 19:
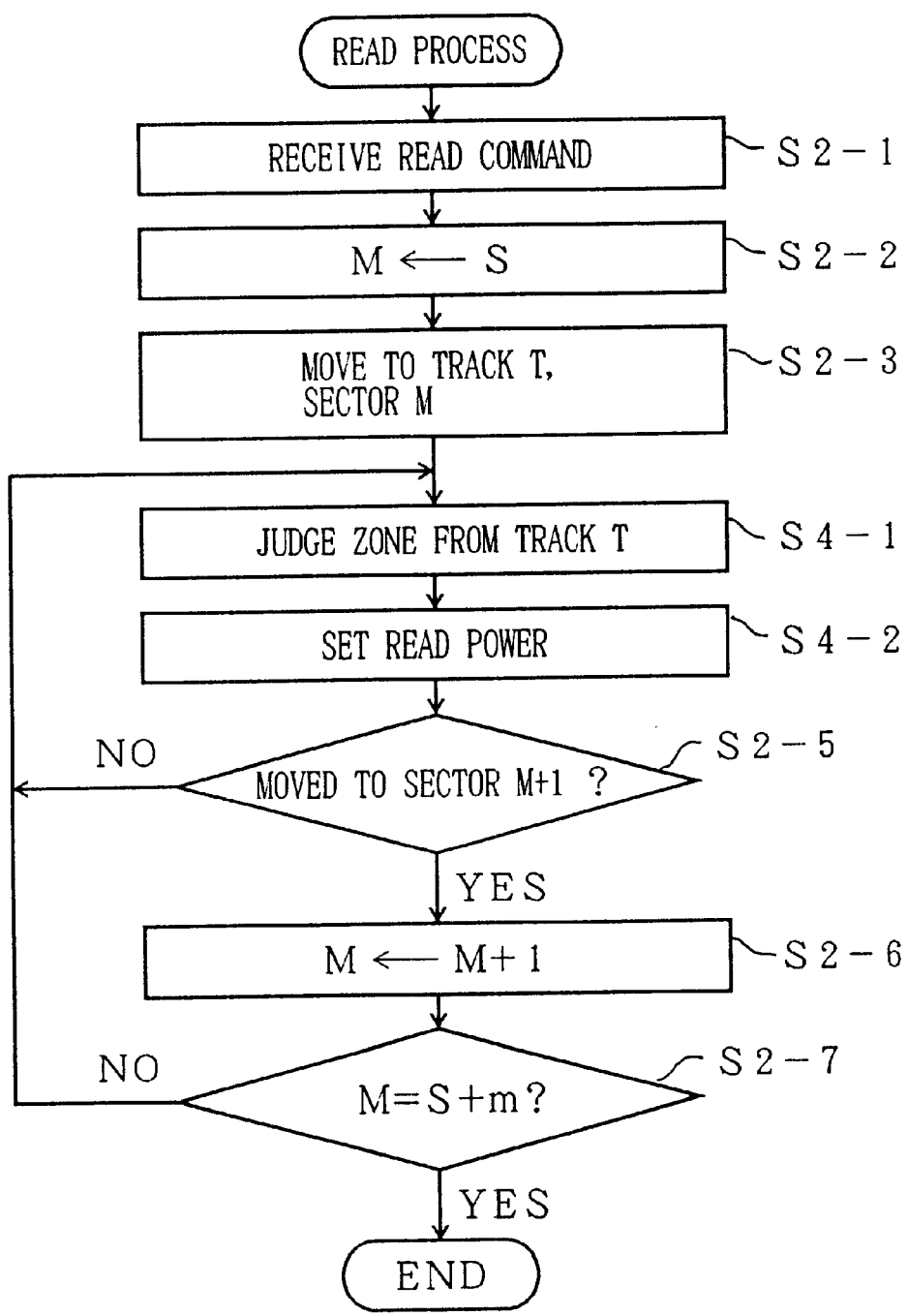
FIG. 19 is a flow chart for explaining an embodiment of the read process of the second embodiment.

FIG. 19 is a flow chart for explaining an embodiment of the read process of the second embodiment. In FIG. 19, those steps which are the same as those corresponding steps in FIG. 13 are designated by the same reference numerals, and a description thereof will be omitted.

After the beam spot is moved to the sector M of the track T in the step S2-3, a step S4-1 judges the zone from the specified track position. Then, a step S4-2 determines the read power offset value from the read power set table 14a depending on the zone and the sector, and sets the read power by adding the determined read power offset value to the default value.

Figure 20:
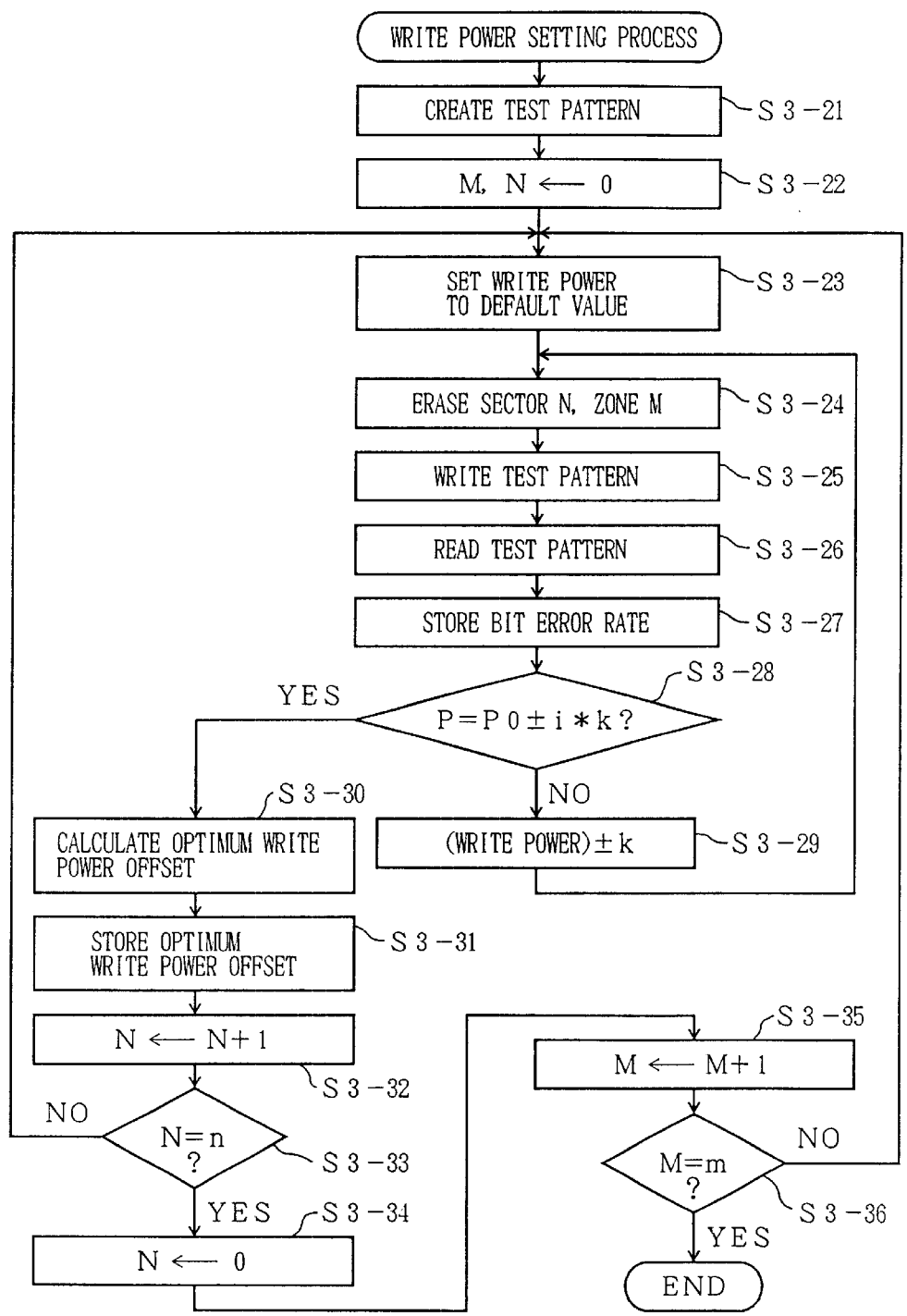
FIG. 20 is a flow chart for explaining an embodiment of the write power setting process of the second embodiment.

FIG. 20 is a flow chart for explaining an embodiment of the write power setting process of the second embodiment.

In this embodiment, the laser power is controlled for each zone, in addition to each sector. For this reason, the write power set process of this embodiment differs from that of the first embodiment described above.

In FIG. 20, when the write power setting process of the MPU 14 is started, a step S3-21 creates a test pattern and stores the test pattern in the buffer memory 20. A step S3-22 sets "0" to a variable N which is internally set for use in identifying the sector, and to a variable M which is internally set for use in identifying the zone. In this embodiment, the MO disk 72 is divided into n sectors #0 through #(n−1) in the circumferential direction, and further, the MO disk 72 is divided into m zones Z0 through Z(m−1) in the radial direction.

A step S3-23 sets the write power to a default value. A step S3-24 erases a sector N of a zone M of a predetermined track on the MO disk 72, and a step S3-25 writes on the sector N of the zone M the test pattern which is stored in the buffer memory 20 in the step S3-21. Thereafter, a step S3-26 reads the test pattern from the sector N of the zone M with a predetermined read power. A step S3-27 calculates a bit error rate e, and stores the calculated bit error rate e in an internal memory of the MPU 20.

After the error rate e is calculated in the step S3-27, a step S3-28 decides whether or not the write power p of the beam spot is p=p0±i*k, where p0 denotes the default value of the write power p, and k denotes an offset value, and i denotes an integer. If the decision result in the step S3-28 is NO, a step S3-29 adds ±k to the write power p, and the process returns to the step S3-24.

The steps S3-24 through S3-29 are repeated until the bit error rates e are respectively obtained and stored with respect to each of the write powers.

If the decision result in the step S3-28 is YES, a step S3-30 calculates an optimum write power offset value $\Delta p_{min}$, and a step S3-31 stores the calculated optimum write power offset value $\Delta p_{min}$ in the write power set table 14b. In other words, the MPU 14 selects the minimum error rate from among the stored error rates obtained by the steps S3-24 through S3-29, and stores the optimum write power offset value $\Delta p_{min}$ in the write power set table 14b which is used to set the write power of the sector N.

Next, a step S3-32 increments N by 1, and a step S3-33 decides whether or not N=n. The process returns to the step S3-23 if the decision result in the step S3-33 is NO, but the process advances to a step S3-34 if the decision result in the step S3-33 is YES. In other words, the variable N which is used to identify the sector is successively incremented by 1, and the steps S3-33 through S3-33 are repeated until the variable N becomes equal to the number n of sectors set with respect to the MO disk 72. In addition, the optimum write power offset value $\Delta p_{min}$ is obtained with respect to all of the sectors #0 through #(n−1) of the zone M set for the MO disk 72, and are stored in the write power set table 14b.

On the other hand, if the decision result in the step S3-33 is YES, a step S3-34 resets N to 0, and a step S3-35 increments M to M+1. Further, a step S3-36 decides whether or not M=m, and the process returns to the step S3-23 if the decision result in the step S3-36 is NO. The process ends if the decision result in the step S3-36 is YES. Hence, the steps S3-23 through S-35 are repeated until the variable M becomes equal to the number m of zones set with respect to the MO disk 72.

Therefore, the write power offset value is set in the write power set table 14b for each sector and each zone.

Next, a description will be given of the write process of this second embodiment.

Figure 21:
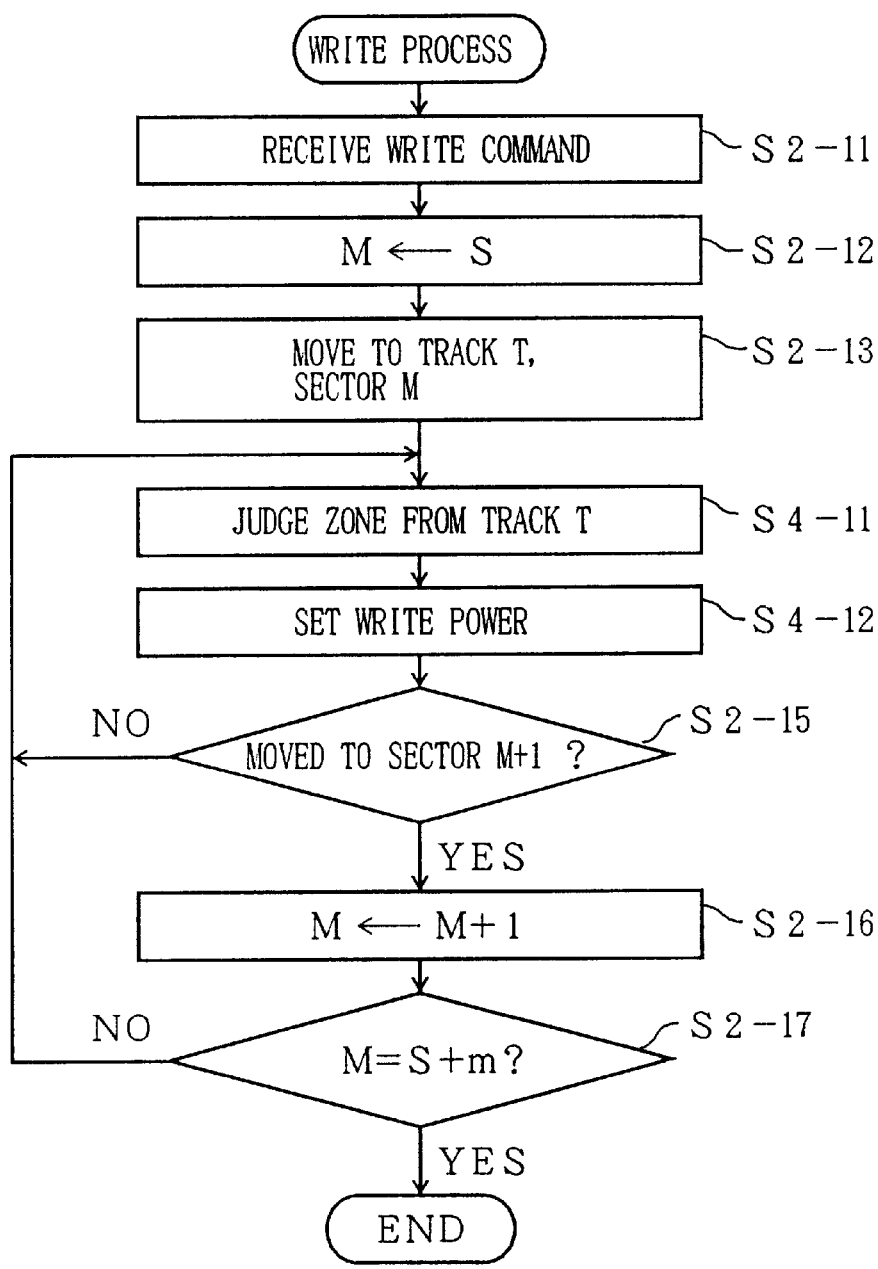
FIG. 21 is a flow chart for explaining an embodiment of the write process of the second embodiment.

FIG. 21 is a flow chart for explaining an embodiment of the write process of the second embodiment. In FIG. 21, those steps which are the same as those corresponding steps in FIG. 15 are designated by the same reference numerals, and a description thereof will be omitted.

In this embodiment, after the beam spot is moved to the sector M of the track T in the step S2-13, a step S4-11 judges the zone from the specified track position. Then, a step S4-12 determines the write power offset value from the write power set table 14b depending on the zone and the sector, and sets the write power by adding the determined write power offset value to the default value.

According to this embodiment, the laser power is controlled not only depending on the sector but also depending on the zone. For this reason, it is possible to cope with the deviation of the laser power in the radial direction of the recording medium caused by deformation of the recording medium in the radial direction.

Furthermore, although the laser power offset value is set for each sector in the first and second embodiments described above, a predetermined number of consecutive sectors may be regarded as 1 block, and the laser power offset value may be set for each of such blocks.

Next, a description will be given of a third embodiment of the optical information storage unit according to the present invention which regards the predetermined number of consecutive sectors as 1 block, and sets the laser power offset value for each block. The construction of this third embodiment of the optical information storage unit may be the same as that of the first embodiment shown in FIGS. 5 and 6 described above, and an illustration thereof will be omitted. This third embodiment of the optical information storage unit employs a third embodiment of the laser power control method according to the present invention.

Figure 22:
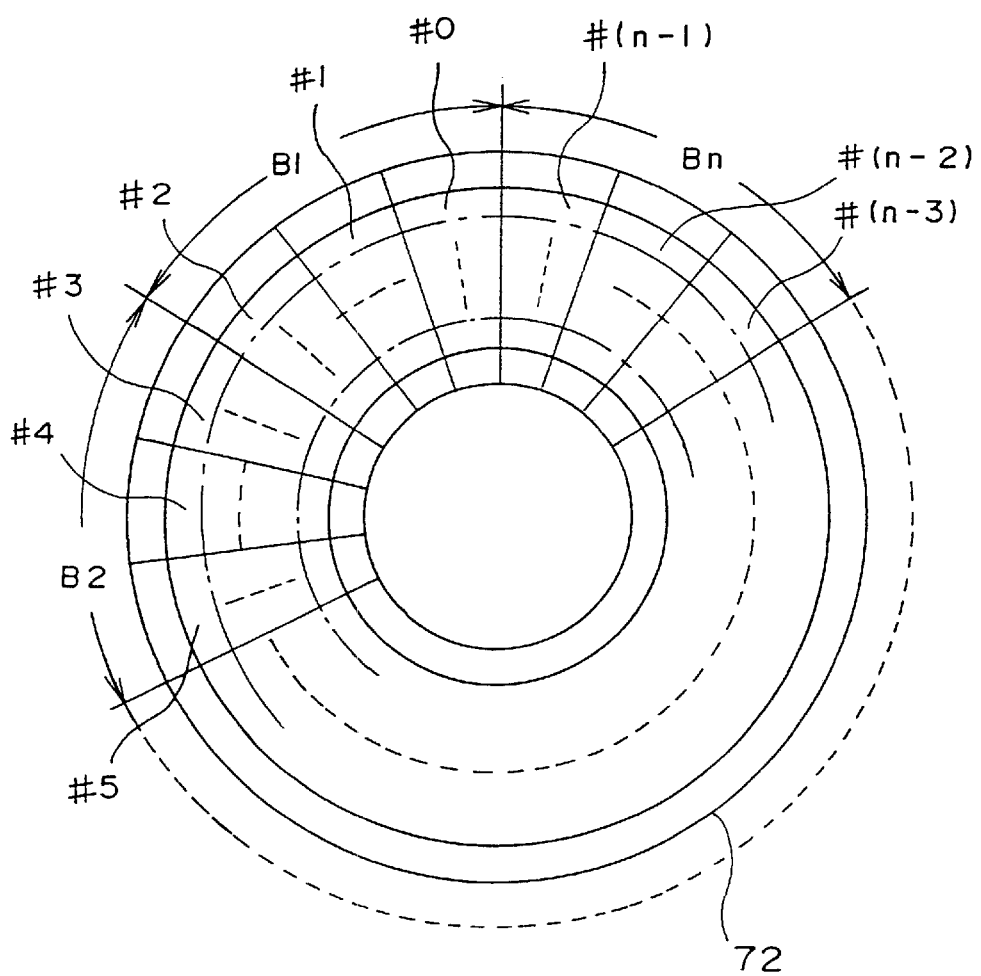
FIG. 22 is a diagram showing a data format of the recording medium used in a third embodiment of the optical information storage unit according to the present invention.

FIG. 22 is a diagram showing a data format of the recording medium used in the third embodiment of the optical information storage unit. In FIG. 22, the recording surface of the MO disk 72 is divided into n sectors #0 through #(n−1). In addition, the sectors #0, #1 and #2 form a block B1, the sectors #3, #4 and #5 form a block B2, . . . , and the sectors #(n−3), #(n−2) and #(n−1) form a block Bn. In other words, n blocks B1 through Bn are provided.

The laser power offset value is set for each of the blocks B1 through Bn. A description of the actual read power setting process will be omitted because the process carried out for each sector in FIGS. 8, 11 and 16 simply needs to be carried out for each of the blocks B1 through Bn. Similarly, a description of the actual write power setting process will be omitted since the process carried out for each sector in FIGS. 14 and 20 simply needs to be carried out for each of the blocks B1 through Bn.

In this embodiment, the data structures of the read power set table 14a and the write power set table 14b are different from those described above, because the read power setting process and the write power setting process are carried out for each of the blocks B1 through Bn.

FIG. 23 is a diagram showing the data structure of an embodiment of a laser power set table of the third embodiment. In FIG. 23, a laser power set table 14d is set with laser power offset values $\Delta p0$ through $\Delta p(n-1)$ with respect to each of the blocks B1 through Bn.

When the laser power set table 14d stores the read power offset values, the read power is set by making a reference to the laser power set table 14d in response to a read command. Similarly, when the laser power set table 14d stores the write power offset values, the write power is set by making a reference to the laser power set table 14d in response to a write command.

Figure 24:
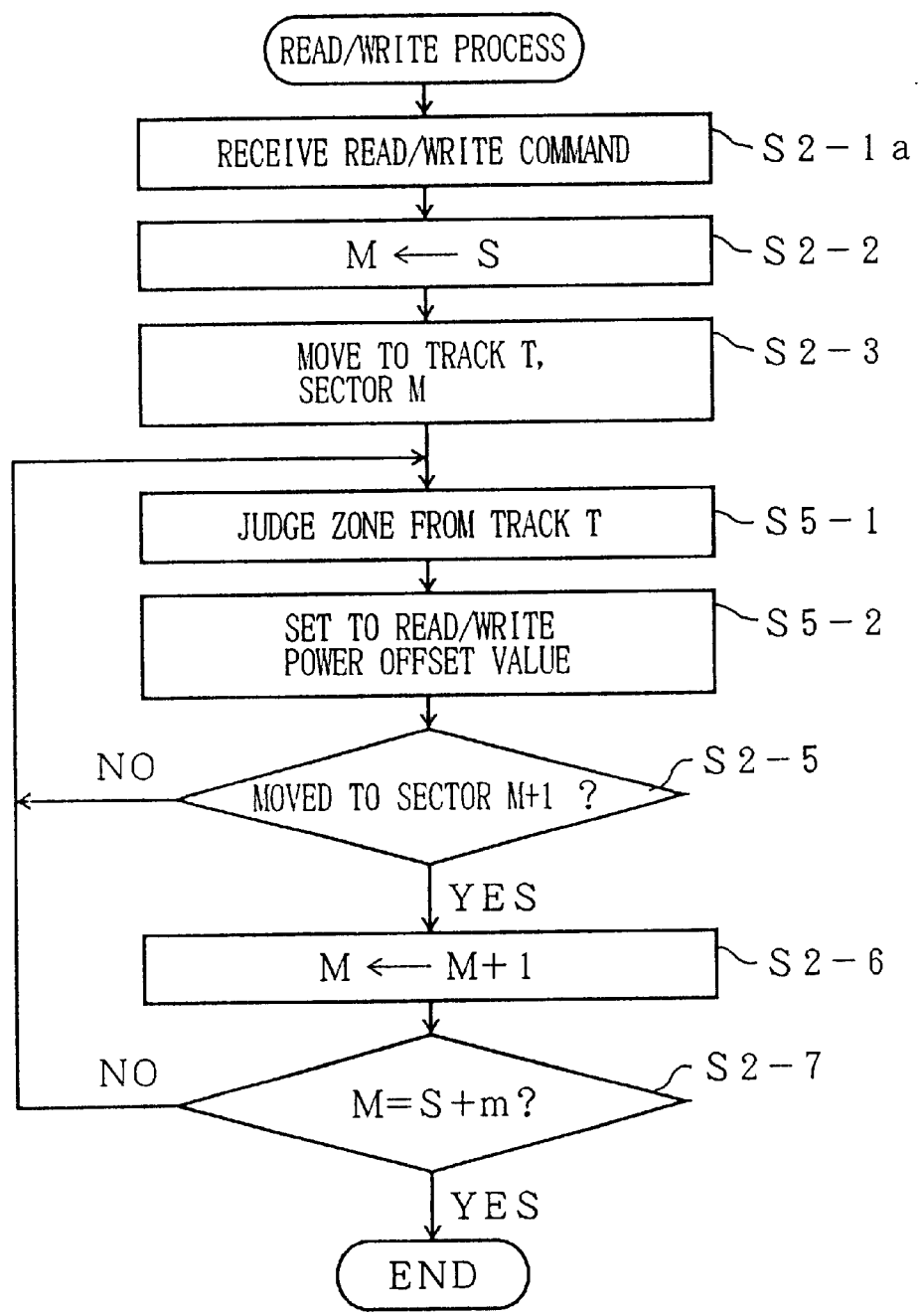
FIG. 24 is a flow chart for explaining an embodiment of a read/write process of the third embodiment.

FIG. 24 is a flow chart for explaining an embodiment of a read/write process of the third embodiment. In FIG. 24, those steps which are the same as those corresponding steps in FIG. 13 are designated by the same reference numerals, and a description thereof will be omitted.

In this embodiment, a step S2-1a receives the read command from the host unit when the read process is started or, receives the write command from the host unit when the write process is started. For example, the read or write command from the host unit requests reading or writing of data amounting to m sectors with respect to a sector S of a track T.

After the beam spot is moved to the sector M of the track T in the step S2-3, a step S5-1 judges the block from the specified sector. Then, a step S5-2 determines the read or write power offset value from the laser power set table 14d depending on the block, and sets the read or write power by adding the determined read or write power offset value to the default value.

According to this embodiment, it is possible to reduce the amount of data to be stored in the laser power set table 14d, because the laser power offset values are stored for each of the blocks.

In the first through third embodiments described above, the read power offset values are stored in the read power set table 14a and the write power offset values are stored in the write power set table 14b. However, it is possible to store the read power directly in the read power set table 14a and to store the write power directly in the write power set table 14b. In other words, the data to be stored in the power set tables 14a, 14b and 14d may be any data which enable the read power or the write power to be obtained therefrom.

The power set tables used in the above described embodiments may be developed in a memory, such as the buffer memory 20, when actually being used.

Further, the present invention is not limited to these embodiments, but various variations and modifications may be made without departing from the scope of the present invention.

What is claimed is:

1. An optical information storage unit which optically stores information on a disk shaped recording medium by irradiating a laser beam on the recording medium by a laser beam irradiating section, the recording medium having a plurality of circumferential power control sectors, the power control sectors being divided into a plurality of radial zones, comprising:

a power control section controlling a laser power of the laser beam which is irradiated on the recording medium by the laser beam irradiating section for each of a predetermined number of power control sectors, irrespective of laser power control based on said radial zones.

2. The optical information storage unit as claimed in claim 1, wherein said power control section controls the laser power of the laser beam for each of the power control sectors dividing a recording surface of the recording medium in a circumferential direction of the recording medium.

3. The optical information storage unit as claimed in claim 2, wherein said power control section controls the laser power of the laser beam for each of the zones dividing the recording surface of the recording medium in a radial direction of the recording medium.

4. The optical information storage unit as claimed in claim 1, wherein said power control section controls the laser power of the laser beam for each of a plurality of circumferential blocks, each of the blocks being made up of a predetermined number of power control sectors dividing a recording surface of the recording medium in a circumferential direction of the recording medium.

5. The optical information storage unit as claimed in claim 3, wherein said power control section controls the laser power of the laser beam for each of the zones dividing the recording surface of the recording medium in a radial direction of the recording medium.

6. The optical information storage unit as claimed in claim 1, wherein said power control section controls the laser power of the laser beam for each of the zones dividing a recording surface of the recording medium in a radial direction of the recording medium.

7. The optical information storage unit as claimed in claim 1, wherein said power control section comprises:

a memory storing set values of the laser power for each region of the recording medium; and a power switching section reading the set value from said memory depending on a region of the recording medium irradiated by the laser beam, and switching the laser power of the laser beam emitted from the laser beam irradiating section based on the read set value.

8. The optical information storage unit as claimed in claim 7, wherein said memory stores, as the set values, offset values each of which is added to an initial value of the laser power when determining the laser power of the laser beam.

9. The optical information storage unit as claimed in claim 7, which further comprises:

a section writing a test pattern on the recording medium and reading the test pattern from the recording medium, said memory storing the set values depending on the test pattern read from the recording medium.

10. The optical information storage unit as claimed in claim 7, which further comprises:

a section storing the set values in said memory when the recording medium is loaded into the optical information storage unit.

11. The optical information storage unit as claimed in claim 7, which further comprises:

a section storing the set values in said memory at predetermined time intervals in a state where the recording medium is loaded in the optical information storage unit.

12. The optical information storage unit as claimed in claim 1, wherein said power control section controls the laser power of the laser beam emitted from the laser beam irradiating section when reading information from the recording medium.

13. The optical information storage unit as claimed in claim 1, wherein said power control section controls the laser power of the laser beam emitted from the laser beam irradiating section when writing information on the recording medium.

14. A laser power control method for controlling a laser power of a laser beam irradiated on a recording medium, the recording medium having a plurality of circumferential sectors, the power control sectors being divided into a plurality of radial zones, comprising the steps of:

(a) controlling the laser power of the laser beam irradiated on the recording medium for each of a predetermined number of target control sectors, irrespective of laser power control based on said radial zones.

15. The laser power control method as claimed in claim 14, wherein said step (a) controls the laser power of the laser beam for each of the power control sectors dividing a recording surface of the recording medium in a circumferential direction of the recording medium.

16. The laser power control method as claimed in claim 14, wherein said step (a) controls the laser power of the laser beam for each of a plurality of circumferential blocks, each of the blocks being made up of a predetermined number of power control sectors dividing a recording surface of the recording medium in a circumferential direction of the recording medium.

17. The laser power control method as claimed in claim 14, wherein said step (a) controls the laser power of the laser beam for each of the zones dividing a recording surface of the recording medium in a radial direction of the recoding medium.

18. The laser power control method as claimed in claim 14, which further comprises the steps of:

(b) storing set values of the laser power in a memory for each region of the recording medium; and (c) reading the set value from the memory depending on a region of the recording medium irradiated by the laser beam, and switching the laser power of the laser beam depending on the read set value.

19. The laser power control method as claimed in claim 18, which further comprises the steps of:

(d) writing a test pattern on the recording medium and reading the test pattern from the recording medium, said step (b) storing the set values depending on the test pattern read from the recording medium.

20. The laser power control method as claimed in claim 14, wherein said step (a) controls the laser power of the laser beam when reading information from or writing information on the recording medium.

21. A laser power control method for controlling a laser power of a laser beam irradiated on a recording medium, comprising the steps of:

(a) writing a test pattern on test tracks of the recording medium;

(b) reading the test pattern from the test tracks;

(c) calculating an error rate based on a comparison of the test pattern written by said step (a) and the test pattern read by said step (b);

(d) storing an optimum read power of the laser beam for minimizing the error rate for each of a plurality of circumferential power control sectors of the recording medium; and (e) controlling the read power of the laser beam during a read operation to the stored optimum read power depending on the power control sector of the recording medium being read, irrespective of laser power control based on radial zones within the power control sectors.

22. An optical information storage unit comprising:

a write and read device which writes information on and reads information from a recording medium, optically, by irradiating a laser beam on the recording beam, a control device which controls the write and read device to write a test pattern on test tracks of the recording medium and read the test pattern from the test tracks;

a calculation device which calculates an error rate based on a comparison of the test patterns written and read by said write and read device;

a memory which stores an optimum read power of the laser beam for minimizing the error rate for each of a plurality of circumferential power control sectors of the recording medium; and a power control device which controls the read power of the laser beam during a read operation to the optimum read power stored in said memory depending on the power control sector of the recording medium being read, irrespective of laser power control based on radial zones within the power control sectors.

23. A laser power control method for controlling a laser power of a laser beam irradiated on a recording medium, comprising the steps of:

(a) writing a test pattern on test tracks of the recording medium;

(b) reading the test pattern from the test tracks;

(c) calculating an error rate based on a comparison of the test pattern written by said step (a) and the test pattern read by said step (b);

(d) storing an optimum write power of the laser beam for minimizing the error rate for each of a plurality of circumferential power control sectors of the recording medium; and (e) controlling the write power of the laser beam during a write operation to the stored optimum write power depending on the power control sector of the recording medium being written, irrespective of laser power control based on radial zones within the power control sectors.

24. An optical information storage unit comprising:

a write and read device which writes information on and reads information from a recording medium, optically, by irradiating a laser beam on the recording medium, a control device which controls the write and read device to write a test pattern on test tracks of the recording medium and read the test pattern from the test tracks;

a calculation device which calculates an error rate based on a comparison of the test patterns written and read by said write and read device;

a memory which stores an optimum write power of the laser beam for minimizing the error rate for each of a plurality of circumferential power control sectors of the recording medium; and a power control device which controls the write power of the laser beam during a write operation to the optimum write power stored in said memory depending on the power control sector of the recording medium being written, irrespective of laser power control based on radial zones within the power control sectors.

* * * * *